US012191487B2

United States Patent
Yoshikawa et al.

(10) Patent No.: US 12,191,487 B2
(45) Date of Patent: Jan. 7, 2025

(54) POSITIVE ACTIVE MATERIAL FOR NONAQUEOUS ELECTROLYTE SECONDARY BATTERY, METHOD FOR PRODUCING POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, NONAQUEOUS ELECTROLYTE SECONDARY BATTERY, AND ENERGY STORAGE APPARATUS

(71) Applicant: GS Yuasa International Ltd., Kyoto (JP)

(72) Inventors: Daisuke Yoshikawa, Kyoto (JP); Shinya Otani, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 395 days.

(21) Appl. No.: 17/636,268

(22) PCT Filed: Jul. 3, 2020

(86) PCT No.: PCT/JP2020/026198
§ 371 (c)(1),
(2) Date: Feb. 17, 2022

(87) PCT Pub. No.: WO2021/039120
PCT Pub. Date: Mar. 4, 2021

(65) Prior Publication Data
US 2022/0293932 A1 Sep. 15, 2022

(30) Foreign Application Priority Data
Aug. 26, 2019 (JP) ................................ 2019-153958

(51) Int. Cl.
*H01M 4/52* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01); *H01M 2004/021* (2013.01); *H01M 2004/028* (2013.01)

(58) Field of Classification Search
CPC ................. H01M 4/525; H01M 4/505; H01M 2004/021; H01M 2004/028; C01G 53/50
See application file for complete search history.

(56) References Cited

U.S. PATENT DOCUMENTS

2014/0045068 A1 2/2014 Yamamoto et al.
2015/0008364 A1 1/2015 Endo
(Continued)

FOREIGN PATENT DOCUMENTS

EP 1391950 A1 2/2004
EP 2144314 A2 1/2010
(Continued)

OTHER PUBLICATIONS

Chu et al., Cobalt in high-energy-density layered cathode materials for lithium ion batteries, Oct. 1, 2022, Journal of Power Sources, vol. 544, https://doi.org/10.1016/j.jpowsour.2022.231873 (Year: 2022).*
(Continued)

*Primary Examiner* — Maria Laios
*Assistant Examiner* — Ziheng Lu
(74) *Attorney, Agent, or Firm* — RANKIN, HILL & CLARK LLP

(57) ABSTRACT

Provided is a positive active material for a nonaqueous electrolyte secondary battery which contains a lithium transition metal composite oxide, the lithium transition metal
(Continued)

composite oxide having an α-NaFeO$_2$ structure, containing Ni, Co and Mn as a transition metal (Me), and having an X-ray diffraction pattern attributable to a space group R3-$m$, in which a ratio of the full width at half maximum of a diffraction peak of the (003) plane to the full width at half maximum of a diffraction peak of the (104) plane, (003)/(104) at a Miller index hkl in X-ray diffraction measurement using a CuKα ray is 0.810 to 0.865, and a crystallite size is 410 Å or more.

7 Claims, 5 Drawing Sheets

(51) Int. Cl.
    *H01M 4/505*    (2010.01)
    *H01M 4/525*    (2010.01)
    *H01M 4/02*    (2006.01)

(56) References Cited

U.S. PATENT DOCUMENTS

| | | | |
|---|---|---|---|
| 2016/0028072 A1* | 1/2016 | Sakai | H01M 4/525 |
| | | | 429/223 |
| 2016/0164094 A1 | 6/2016 | Takei et al. | |
| 2016/0218358 A1 | 7/2016 | Sakai et al. | |
| 2017/0187031 A1 | 6/2017 | Kurita et al. | |
| 2017/0237069 A1 | 8/2017 | Takamori et al. | |
| 2017/0288215 A1 | 10/2017 | Mitsumoto et al. | |
| 2018/0366773 A1* | 12/2018 | Endo | H01M 10/052 |
| 2019/0221837 A1* | 7/2019 | Ishikawa | H01M 4/485 |
| 2021/0028453 A1 | 1/2021 | Imanari et al. | |

FOREIGN PATENT DOCUMENTS

| | | | | |
|---|---|---|---|---|
| JP | 2000243394 A | * | 9/2000 | |
| JP | 2008-293988 A | | 12/2008 | |
| JP | 2014-203509 A | | 10/2014 | |
| JP | 2015-213080 A | | 11/2015 | |
| JP | 2015-227263 A | | 12/2015 | |
| JP | 2016-110889 A | | 6/2016 | |
| JP | 2016-136464 A | | 7/2016 | |
| JP | 2018-41657 A | | 3/2018 | |
| JP | 2018-81937 A | | 5/2018 | |
| JP | 2018-206609 A | | 12/2018 | |
| JP | 2019-149371 A | | 9/2019 | |
| WO | 2012/133113 A1 | | 10/2012 | |
| WO | 2015/182665 A1 | | 12/2015 | |
| WO | 2016/035852 A1 | | 3/2016 | |
| WO | 2016/060105 A1 | | 4/2016 | |
| WO | 2017/104736 A1 | | 6/2017 | |
| WO | WO-2017104688 A1 | * | 6/2017 | ........... C01G 53/006 |

OTHER PUBLICATIONS

Yang et al., Preparation and application of PVDF-HFP composite polymer electrolytes in LiNi0.5Co0.2Mn0.3O2 lithium-polymer batteries, May 6, 2014, Electrochimica Acta, 258-265, https://doi.org/10.1016/j.electacta.2014.04.100 (Year: 2014).*

Jouanneau et al., "Influence of LiF Additions on Li[NixCo1—2xMnx]O2 Materials Sintering, Structure, and Lithium Insertion Properties", Journal of the Electrochemical Society, 2004, 151 (10), pp. A1749-A1754, total 7 pages; Cited in Specification.

Kim et al.,"Improvement of High-Voltage Cycling Behavior of Surface-Modified Li[Ni1/3Co1/3Mn1/3]O2 Cathodes by Fluorine Substitution for Li-Ion Batteries", Journal of the Electrochemical Society, 2005, 152 (9), pp. A1707-A1713, total 8 pages; Cited in Specification.

Kim et al., "Comparison of Structural Changes in Fully Delithiated Lix[Ni1/3Co1/3Mn1/3]O2 and Lix [Ni0.33Co0.33Mn0.30Mg0.04]O1.96F0.04 Cathodes (x=0) upon Thermal Annealing", Journal of the Electrochemical Society, 2007, 154 (6), pp. A561-A565, total 6 pages; Cited in Specification.

Yabuuchi et al., "Solid-State Chemistry and Electrochemistry of LiCo1/3Ni1/3Mn1/3O2 for Advanced Lithium-Ion Batteries III. Rechargeable Capacity and Cycleability", Journal of the Electrochemical Society, 2007, 154 (4), pp. A314-A321, total 9 pages; Cited in Specification.

International Search Report (ISR) dated Sep. 29, 2020 filed in PCT/JP2020/026198.

* cited by examiner

POSITIVE ACTIVE MATERIAL FOR NONAQUEOUS ELECTROLYTE SECONDARY BATTERY, METHOD FOR PRODUCING POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, NONAQUEOUS ELECTROLYTE SECONDARY BATTERY, AND ENERGY STORAGE APPARATUS

TECHNICAL FIELD

The present invention relates to a positive active material for a nonaqueous electrolyte secondary battery, a method for producing the positive active material, a positive electrode for a nonaqueous electrolyte secondary battery which contains the positive active material, a nonaqueous electrolyte secondary battery including the positive electrode, and an energy storage apparatus.

BACKGROUND ART

Heretofore, a lithium transition metal composite oxide having an $\alpha$-$NaFeO_2$-type crystal structure has been examined as a positive active material for a nonaqueous electrolyte secondary battery, and a nonaqueous electrolyte secondary battery using $LiCoO_2$ has been widely put to practical use. However, $LiCoO_2$ has a discharge capacity of about 120 to 130 mAh/g. Thus, so-called "$LiMeO_2$-type" active materials obtained by substituting Co with Ni, Mn, Al or the like and having a discharge capacity of 150 to 180 mAh/g, such as $LiNi_{1/2}Mn_{1/2}O_2$, $LiNi_{1/3}Co_{1/3}Mn_{1/3}O_2$ and $LiNi_xCo_yAl_zO_2$ (x+y+z=1), have been examined or put to practical use.

It is known that battery characteristics such as discharge capacity and charge-discharge cycle performance of a battery using any of these lithium transition metal composite oxides as a positive active material depend on the crystallinity of an active material and the physical properties of powder in addition to the types and the composition ratio of elements forming the transition metal.

Patent Document 1 discloses "a positive active material for a lithium secondary battery in which a ratio of a crystallite size $\alpha$ at a peak within the range of $2\theta=18.7\pm1°$ to a crystallite size $\beta$ at a peak within the range of $2\theta=44.6\pm1°$, $\alpha/\beta$ is 1 or more and 1.75 or less in powder X-ray diffraction measurement using a CuK$\alpha$ ray, the positive active material having the following composition formula (I);

(wherein $0\le x\le 0.2$, $0.3<a<0.7$, $0<b<0.4$, $0<c<0.4$, $0\le d<0.1$, a+b+c+d=1, and M is at least one metal selected from the group consisting of Fe, Cr, Ti, Mg, Al and Zr)".

In addition, it is described that "in the present embodiment, $\alpha/\beta$ is preferably more than 1, more preferably 1.05 or more, still more preferably 1.1 or more, from the viewpoint of obtaining a lithium secondary battery having a high charge capacity; and $\alpha/\beta$ is preferably 1.5 or less, more preferably 1.4 or less, still more preferably 1.3 or less, from the viewpoint of obtaining a lithium secondary battery having higher initial coulombic efficiency (paragraph [0039]), and it is shown that among examples, one with the smallest $\alpha/\beta$ is Example 1 where x is 0.06, a is 0.60, b is 0.20, c is 0.20 and $\alpha/\beta$ is 1.04, and one with the largest $\alpha/\beta$ is Example 20 where x is 0.05, a is 0.55, b is 0.21, c is 0.24, and $\alpha/\beta$ is 1.67 (paragraphs [0129] to [0311]).

Patent Document 2 discloses "a positive active material for a lithium secondary battery, which contains at least nickel, cobalt and manganese and has a layered structure, the positive active material satisfying the following requirements (1) to (3):

(1) the primary particle size is 0.1 μm or more and 1 μm or less, and the cumulative volume particle size at 50%, D50 is 1 μm or more and 10 μm or less;
(2) the ratio of the cumulative volume particle size at 90%, $D_{90}$ to the cumulative volume particle size at 10%, $D_{10}$ ($D_{90}/D_{10}$) is 2 or more and 6 or less; and
(3) the amount of lithium carbonate contained in the residual alkali on the particle surface is 0.1 mass % or more and 0.8 mass % or less as measured by neutralization titration", and "the positive active material for a lithium secondary battery, which has the following composition formula (I):

(wherein $0.9\le a\le 1.2$, $0<x<0.4$, $0<y<0.4$, $0\le z<0.1$, $0.5<1-x-y-z\le 0.65$, and M is one or more metals selected from Mg, Al and Zr.)".

In addition, it is shown that values obtained by dividing a crystallite size at a peak within the range of $2\theta=18.7\pm1°$ (peak A) by the crystallite size at a peak within the range of $2\theta=44.6\pm1°$ (peak B) in powder X-ray diffraction measurement of the positive active material using a CuK$\alpha$ ray are 1.6 (peak A: 700 Å and peak B: 425 Å), 1.6 (peak A: 857 Å and peak B: 520 Å), 1.7 (peak A: 789 Å and peak B: 464 Å), 1.7 (peak A: 866 and peak B: 520 Å), 1.7 (peak A: 848 Å and peak B: 488 Å), 1.7 (peak A: 847 Å and peak B: 505 Å), 1.7 (peak A: 848 Å and peak B: 496 Å), 1.6 (peak A: 805 Å and peak B: 496 Å) and 1.5 (peak A: 774 Å and peak B: 514 Å) in Examples 1 to 9, respectively, and the discharge capacity and the discharge capacity retention ratio of a lithium secondary battery using this positive active material are shown (paragraphs [0120] to [0156] and [0174] to [0225]).

Patent Literature 3 discloses "the lithium metal composite oxide powder, wherein a ratio of a crystallite size of the (003) plane to a crystallite size of the (110) plane of the lithium metal composite oxide, which is calculated from the Scherrer's equation using an X-ray diffraction pattern obtained by X-ray diffraction using a CuK$\alpha$1 ray, is more than 1.0 and less than 2.5" (claim 7) in relation to "lithium metal composite oxide powder comprising a particle including a surface portion in which one selected from the group consisting of Al, Ti and Zr or a combination of two or more thereof (referred to as a "surface element A") is present on the surface of a particle including a lithium metal composite oxide having a layered crystal structure".

In addition, it is described that "the lithium metal composite oxide particle is preferably a particle including a lithium metal composite oxide having a layered crystal structure and represented by the general formula (1): $Li_{1+x}M_{1-x}O_2$ (wherein M is one selected from the group consisting of Mn, Co, Ni, a transition element present between a Group 3 element and a Group 11 element of the periodic table, and any of representative elements up to the third period of the periodic table, or combinations of two or more thereof (this is referred to as a "constituent element M"))" (paragraph[0024]) and "when "M" in the above formula (1) contains three elements of Mn, Co and Ni, the molar content ratio of Mn, Co and Ni satisfies preferably Mn:Co:Ni=0.10 to 0.45:0.03 to 0.40:0.30 to 0.75, and in particular, more preferably Mn Co:Ni=0.10 to 0.40:0.03 to 0.40:0.30 to 0.75" (paragraph [0027]).

It is described that "expansion and contraction during introduction and removal of Li may become more isotropic as the ratio of the crystallite size of the (003) plane to the crystallite size of the (110) plane becomes closer to 1.0; and when the ratio of the crystallite size of the (003) plane to the crystallite size of the (110) plane is less than 2.5, the anisotropy of expansion and contraction can be suppressed, so that the capacity retention ratio after cycles can be more reliably maintained; . . . " (paragraph [0040]).

Patent Document 4 discloses "a positive active material comprising a lithium nickel composite oxide in which a ratio of a diffraction peak intensity I (003) of the (003) plane to a diffraction peak intensity I (104) of the (104) plane, I (003)/(104) is 0.92 or more and 1.02 or less, a full width at half maximum FWHM (003) of a diffraction peak of the (003) plane is 0.13 or more and 0.15 or less, and a full width at half maximum FWHM (104) of a diffraction peak of the (104) plane is 0.15 or more and 0.18 or less as measured by X-ray diffraction, and an average valence of a transition metal is 2.9 or more as calculated by XAFS analysis or CHNO element analysis"; and "the lithium-nickel composite oxide, which has a composition represented by the following general formula (1):

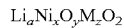
$$\text{Li}_a\text{Ni}_x\text{O}_y\text{M}_z\text{O}_2 \qquad \text{general formula (1)}$$

wherein

M is one or more metal elements selected from the group consisting of Al, Mn, . . . , a satisfies $0.20 \leq a \leq 1.20$, x satisfies $0.80 \leq x < 1.00$, y satisfies $0 < y \leq 0.20$, z is $0 \leq z \leq 0.10$, and $x+y+z=1$.

It is described that "in the lithium-nickel composite oxide according to the present embodiment, the full width at half maximum FWHM (104) of the diffraction peak of the (104) plane in X-ray diffraction is 0.15 or more and 0.18 or less; As demonstrated in Examples to be described later, the cycle performance of the lithium ion secondary battery 10 is improved when the full width at half maximum FWHM (104) of the diffraction peak of the (104) plane has a value within such a range; On the other hand, it is not preferable that the full width at half maximum FWHM (104) of the diffraction peak of the (104) plane is less than 0.15 because the cycle performance is deteriorated; and it is not preferable that the full width at half maximum FWHM (104) of the diffraction peak of the (104) plane is more than 0.18 because the discharge capacity decreases" (paragraph [0030]), and as Examples 1 to 9, positive active materials are disclosed which are obtained by firing a coprecipitation carbonate and lithium hydroxide at a firing temperature of 770 to 790° C. under an oxygen partial pressure of 0.1 MPa to 0.5 MPa and have a composition of $\text{Li}_a\text{Ni}_x\text{Co}_y\text{M}_z\text{O}_2$ where a is 1, 1.03 or 1.06 and x is 0.85 or 0.9 (paragraphs [0083] to [0107]).

Patent Literature 5 discloses "a positive active material comprising a composite oxide of the composition formula: $\text{Li}_a\text{Mn}_{0.5-x}\text{Ni}_{0.5-y}\text{M}_{x+y}\text{O}_2$ (wherein $0 < a < 1.3$, $-0.1 \leq x-y \leq 0.1$, and M is an element other than Li, Mn and Ni" and "the positive active material, wherein the full width at half maximum of a diffraction peak at $2\theta$: $18.6 \pm 1°$ is 0.05° or more and 0.20° or less, and the full width at half maximum of a diffraction peak at $2\theta$: $44.1 \pm 1°$ is 0.10° or more and 0.20° or less". As an example for claim 7, a positive active material is shown in which the full width at half maximum of a diffraction peak at $2\theta$: $44.1 \pm 1°$ is 0.118 to 0.200° (Tables 2 and 5), and the discharge capacity, cycle performance and discharge efficiency of a nonaqueous electrolyte secondary battery using the positive active material are shown (Tables 8 and 9).

In addition, Patent Document 5 discloses "a method for producing a positive active material containing a composite oxide of the composition formula: $\text{Li}_a\text{Mn}_{0.5-x}\text{Ni}_{0.5-y}\text{M}_{x+y}'\text{O}_2$ (wherein $0.98 \leq a < 1.1$, $-0.1 \leq x-y \leq 0.1$, and M' is at least one element selected from B, Al, Mg and Co), the method comprising preparing the composite oxide by passing through "a coprecipitation step of adding an alkali compound, a reducing agent and a complexing agent to an aqueous solution of a nickel (Ni) compound and a manganese (Mn) compound in water or an aqueous solution of a Ni compound, a Mn compound and an M' compound (M' is the same as described above) in water to adjust the pH of the aqueous solution to 10 to 13, and precipitating a Ni—Mn composite coprecipitate or a Ni—Mn-M' composite coprecipitate in the aqueous solution"", "the method for producing a positive active material, wherein the complexing agent is a compound capable of dissociating ammonium ions in an aqueous solution", "the method for producing a positive active material, wherein the "compound capable of dissociating ammonium ions in an aqueous solution" is one or more compounds selected from the group consisting of ammonium nitrate, ammonium sulfate, ammonium hydrochloride and aqueous ammonia", and "the method for producing a positive active material, wherein the M' is Co."

Further, it is described that as a specific coprecipitation step, "an aqueous nickel sulfate solution at 1.7 mol/liter, an aqueous manganese sulfate solution at 1.1 mol/liter, an aqueous cobalt sulfate solution at 1.5 mol/liter, an aqueous ammonium sulfate solution at 6 mol/liter and a 4 wt % aqueous hydrazine solution were mixed at a volume ratio of 11:17:5.0:1.4:0.42 (liter), respectively, to obtain a raw material solution of Ni/Mn/Co=5/5/2 (molar ratio); this raw material solution was continuously added dropwise to a reaction tank at a flow rate of 13 ml/min; and . . . 120 hours after the addition of the raw material solution was started, a slurry of a nickel-manganese-cobalt composite coprecipitate considered to be a hydroxide or an oxide which is a reaction crystallized product was continuously collected from an overflow pipe 13 for 24 hours" (paragraphs [0555] to [0559]).

Patent Document 6 discloses "a method for producing a nickel-cobalt-manganese composite hydroxide represented by general formula: $\text{Ni}_x\text{Co}_y\text{Mn}_z\text{M}_t(\text{OH})_{2+a}$ ($x+y+z+t=1$, $0.05 \leq x \leq 0.3$, $0.1 \leq y \leq 0.4$, $0.6 \leq z \leq 0.8$, $0 \leq t \leq 0.1$, $0 \leq a \leq 0.5$, and M is one or more additive elements selected from Mg, Ca, Al, Ti, V, Cr, Zr, Nb, Mo and W), the method comprising: a nucleation step of performing nucleation by controlling an aqueous solution for nucleation, which contains at least a metal compound containing nickel, a metal compound containing cobalt, a metal compound containing manganese and an ammonium ion donor at an ammonium ion concentration of 12 to 30 g/L, to a pH value of 11.0 to 14.0 at a standard liquid temperature of 25° C.; and a particle growing step of controlling an aqueous solution for growth of particles, which contains a nucleus formed in the nucleation step, to a pH value of 10.5 to 12.5 at a standard liquid temperature of 25° C., and adding ammonia in an atmosphere of a mixture of an inert gas and oxygen to maintain an ammonium ion concentration within the range of 12 to 30 g/L, so that the nucleus is grown to obtain a nickel-cobalt-manganese composite hydroxide particle", in relation to "a nickel-cobalt-manganese composite hydroxide having a high density, particularly a nickel-cobalt-manganese composite hydroxide used as a precursor of a positive active material for a nonaqueous electrolyte secondary battery and a method for producing the same" (paragraph [0001]).

In addition, it is described that in the nucleation step, "an aqueous solution before reaction, which contains an aqueous ammonia solution, is provided in a reaction tank", and on the other hand, "a metal compound containing nickel, a metal compound containing cobalt and a metal compound containing manganese are dissolved in water at a predetermined ratio to prepare a mixed aqueous solution" (paragraph [0044]) and "the mixed aqueous solution is supplied into a reaction tank while the aqueous solution before reaction is stirred" (paragraph [0046]).

Patent Document 7 describes "a positive active material for a lithium secondary battery comprising a lithium transition metal composite oxide, wherein the lithium transition metal composite oxide has an $\alpha$-NaFeO$_2$ structure, a full width at half maximum of a diffraction peak at 2θ=44±1° in a powder X-ray diffraction diagram using a CuKα ray is 0.125 to 0.145°, and a porosity is 1.5 to 3.5%", "a method for producing a precursor to be used for producing a positive active material for a lithium secondary battery which contains a lithium transition metal composite oxide, the method comprising precipitating a transition metal compound in a solution containing fluorine ions to produce a precursor of a lithium transition metal composite oxide having an $\alpha$-NaFeO$_2$ structure", "the method for producing a precursor, wherein the solution containing fluorine ions contains ammonium ions", and "a method for producing a positive active material for a lithium secondary battery which contains a lithium transition metal composite oxide, the method comprising adding a lithium compound and a sintering aid to a precursor produced by the method for producing a precursor, and firing the mixture to produce a lithium transition metal composite oxide having an $\alpha$-NaFeO$_2$ structure".

In addition, it is described that it is also known that when LiF is mixed as a sintering aid during sintering of a coprecipitation precursor of a transition metal hydroxide and a lithium hydroxide in the step of synthesizing a lithium transition metal composite oxide, structural stability associated with densification and charge-discharge (see, for example, Non-Patent Documents 2 to 4)" (paragraph [00151); "the present inventors prepared a lithium secondary battery by using a lithium transition metal composite oxide as a positive active material, and examined a relationship between the full width at half maximum ratio FWHM (003)/FWHM (104) in a state at the end of discharge and the full width at half maximum ratio FWHM (003)/FWHM (104) in a state at the end of charge; resultantly, it was found that as in the lithium transition metal composite oxide used in the first embodiment, the progress of cracking of active material particles with a charge-discharge cycle is remarkably suppressed to improve charge-discharge cycle performance when the ratio of FWHM (003)/FWHM (104) in an immediately subsequent state at the end of charge to FWHM (003)/FWHM (104) in a state at the end of discharge is 0.72 or more, i.e. when a change in crystal anisotropy with a shift from an initial state at the end of discharge to a subsequent state at the end of charge is within a specific range" (paragraph [0040]), "in general, a change in grid volume with charge-discharge is known as a cause for generating a crack on a particle of the active material and expansion of an electrode plate; however, it has been confirmed that in a lithium transition metal oxide such as LiNi$_{1/3}$Co$_{1/3}$Mn$_{1/3}$O$_2$ which is used as a positive active material and in which the ratio of Ni, Co and Mn is 1:1:1, there is little change in grid volume with charge-discharge (see Non-Patent Document 1); thus, the present inventors thought that factors other than the "change in grid volume with charge-discharge" exist as a cause for generating a crack on a particle and expansion of an electrode plate, and examined and studied a relationship between various physical properties of the lithium transition metal composite oxide and charge-discharge cycle performance; and resultantly, it was found that in any lithium transition metal composite oxide, the crystallite size decreased with a shift from the end of discharge to the end of charge, but an increase in DCR with a charge-discharge cycle is suppressed, and in a lithium transition metal composite oxide exhibiting excellent charge-discharge performance, the amount of a decrease in crystallite size is small" (paragraph [0043]).

In examples, it is described that in preparation of a positive active material for a lithium secondary battery, an aqueous solution containing sulfates of nickel, cobalt and manganese is added dropwise to a reaction tank containing an aqueous solution in which ammonium fluoride is dissolved, so that coprecipitation is performed to prepare a hydroxide precursor (paragraph [0096]).

PRIOR ART DOCUMENTS

Patent Documents

Patent Document 1: WO 2016/060105 A
Patent Document 2: WO 2015/182665 A
Patent Document 3: WO 2016/035852 A
Patent Document 4: JP-A-2016-110889
Patent Document 5: JP-A-2008-293988
Patent Document 6: JP-A-2015-227263
Patent Document 7: WO 2017/104688 A Non-Patent Documents Non-Patent Document 1: J. Electrochem. Soc., Yabuuchi et al, 154 (4), A314-A321 (2007)
Non-Patent Document 2: J. Electrochem. Soc., Kim et al, 152(9), A1707-A1713 (2005)
Non-Patent Document 3: J. Electrochem. Soc., Kim et al, 154(6), A561-A565 (2007)
Non-Patent Document 4: J. Electrochem. Soc., Jouanneau et al, 151, 1749 (2004)

DISCLOSURE OF THE INVENTION

Problems to be Solved by the Invention

One of factors that affect charge-discharge cycle performance is expansion and contraction of positive active material particles with insertion/extraction of lithium ions. Breakage (cracking) may occur at interfaces between primary particles forming secondary particles of the positive active material due to expansion and contraction of the positive active material particles with a charge-discharge cycle.

Among LiMeO$_2$-type positive active materials, positive active materials in which the molar content ratio of Ni, Co and Mn in the transition metal element Me is substantially 1:1:1 (LiNi$_{1/3}$Co$_{1/3}$Mn$_{1/3}$O$_2$: hereinafter, referred to as "NCM 111") are known to have relatively small volume expansion and contraction with charge-discharge (see Non-Patent Document 1). However, a LiMeO$_2$-type positive active material having a higher molar content ratio of Ni to the transition metal element Me over NCM 111 has the problem that the active material particles are likely to be cracked with a charge-discharge cycle because volume expansion and contraction with charge-discharge is large. FIG. 3 shows a photograph of positive active material particles after a charge-discharge cycle is repeated 300 times in which a nonaqueous electrolyte secondary battery using a commercially available LiMeO$_2$-type positive active material (LiNi$_{0.5}$Co$_{0.2}$Mn$_{0.3}$O$_2$) having a high molar content ratio of Ni to the transition metal element Me for a positive electrode is subjected to constant voltage and constant current charge up to 1 C and 4.25 V and subjected to constant current discharge up to 1 C and 2.75 V at 60° C. It is apparent that cracks are generated along the interfaces of the primary particles.

As an example of a technique for improving the charge-discharge cycle performance of the LiMeO$_2$-type positive active material, it is known that the firing temperature is raised during synthesis of an active material for enhancing crystallinity, or a sintering agent such as lithium halide is added and the mixture is sintered as described in Patent Document 7 and Non-Patent Documents 2 to 4. However, application of the above-described known technique to a composition having a higher molar content ratio of Ni to the transition metal element Me over NCM 111 has the problem that a structural change occurs, leading to a decrease in capacity.

Patent Documents 1 to 3 disclose a crystallite size ratio (003)/(104) or (003)/(110) obtained by dividing a crystallite size in the (003) plane (2θ=18.7±1°) by a crystallite size in the (104) plane (2θ=44.6±1°) or the (110) plane in a LiMeO$_2$-type active material (hereinafter, referred to as a "nickel-type active material") having a higher molar content ratio of Ni to the transition metal element Me over NCM 111, as well as a capacity, initial coulombic efficiency, a capacity retention ratio, and the like of a battery using a nickel-type active material for a positive electrode.

Patent Documents 4 and 5 discloses cycle performance, a discharge capacity and the like of a battery using, for a positive electrode, a nickel-type active material in which one or more of a full width at half maximum of a diffraction peak of the (003) plane (hereinafter, referred to as "FWHM (003)"), a full width at half maximum of a diffraction peak of the (104) plane (hereinafter, referred to as "FWHM (104)"), and a ratio of the full width at half maximum FWHM (003)/FWHM (104) are specified.

Patent Document 7 describes that a lithium secondary battery using, as a positive active material, a lithium transition metal composite oxide in which the ratio of FWHM (003)/FWHM (104) in an immediately subsequent state at the end of charge to FWHM (003)/FWHM (104) in a state at the end of discharge is specified has improved charge-discharge cycle performance.

In addition, Patent Documents 5 to 7 describe that a hydroxide precursor prepared by using a complexing agent for supplying ammonia ions is used for production of a positive active material.

An object of the present invention is to provide a positive active material for a nonaqueous electrolyte secondary battery which is excellent in charge-discharge cycle performance, a method for producing the positive active material, a positive electrode for a nonaqueous electrolyte secondary battery which contains the positive active material, a nonaqueous electrolyte secondary battery including the positive electrode, and an energy storage apparatus.

Means for Solving the Problems

One aspect of the present invention is a positive active material for a nonaqueous electrolyte secondary battery containing a lithium transition metal composite oxide, the lithium transition metal composite oxide having an α-NaFeO$_2$ structure, containing Ni, Co and Mn as a transition metal (Me), and having an X-ray diffraction pattern attributable to R3-m, in which a ratio of the full width at half maximum of a diffraction peak of the (003) plane to the full width at half maximum of a diffraction peak of the (104) plane, (003)/(104) at a Miller index hkl in X-ray diffraction measurement using a CuKα ray is 0.810 to 0.865, and a crystallite size is 410 Å or more.

Another aspect of the present invention is a method for producing the positive active material for a nonaqueous electrolyte secondary battery, the method including supplying an aqueous solution containing halogen ions, ammonium ions, and Ni, Co and Mn as transition metals (Me) to a reaction tank to precipitate a carbonate precursor containing Ni, Co and Mn, mixing the carbonate precursor with a lithium compound, and firing the mixture to produce a lithium transition metal composite oxide.

Still another aspect of the present invention is a positive electrode for a nonaqueous electrolyte secondary battery which contains the positive active material according to the aspect.

Still another aspect of the present invention is a nonaqueous electrolyte secondary battery including the positive electrode, a negative electrode, and a nonaqueous electrolyte.

Still another aspect of the present invention is an energy storage apparatus including a plurality of the nonaqueous electrolyte secondary batteries.

Advantages of the Invention

According to the present invention, it is possible to provide a positive active material for a nonaqueous electrolyte secondary battery which has improved charge-discharge cycle performance, a method for producing the positive active material, a positive electrode for a nonaqueous electrolyte secondary battery which contains the positive active material, a nonaqueous electrolyte secondary battery including the positive electrode, and an energy storage apparatus.

BEST MODE FOR CARRYING OUT THE INVENTION

Figure 1:
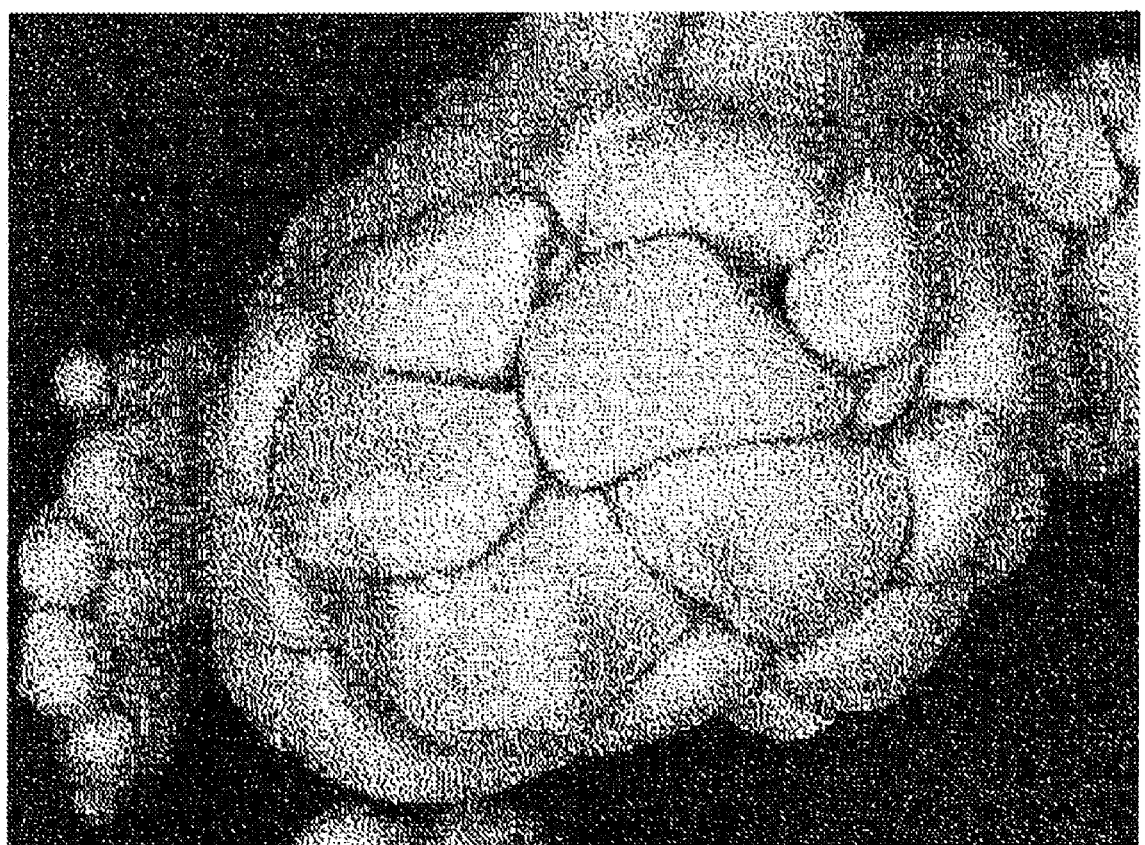
FIG. 1 is a photograph of lithium transition metal composite oxide particles prepared by a method according to an embodiment of the present invention.

The configuration and operational effects of the present invention will be described together with the technical concept. However, the mechanism of action includes presumptions, and whether it is right or wrong does not limit the present invention. Incidentally, the present invention can be performed in other various forms without departing from the spirit or main feature thereof. Accordingly, the embodiments and examples described below are merely examples in every respect, and they should not be construed as restrictive. Further, variations and modifications falling under the scope equivalent to the claims are all within the scope of the present invention.

An embodiment of the present invention (hereinafter, referred to as a "first embodiment") is a positive active material for a nonaqueous electrolyte secondary battery containing a lithium transition metal composite oxide, the lithium transition metal composite oxide having an $\alpha$-NaFeO$_2$ structure, containing Ni and Mn as a transition metal (Me), and having an X-ray diffraction pattern attributable to R3-m, in which a ratio of the full width at half maximum of a diffraction peak of the (003) plane to the full width at half maximum of a diffraction peak of the (104) plane, (003)/(104) at a Miller index hid in X-ray diffraction measurement using a CuK$\alpha$ ray is 0.810 to 0.865, and a crystallite size is 410 Å or more.

<Composition of Lithium Transition Metal Composite Oxide>

The positive active material for a nonaqueous electrolyte secondary battery according to the first embodiment contains a lithium transition metal composite oxide containing Ni, Co and Mn as transition metal elements (Me). The lithium transition metal composite oxide is typically represented by the composition formula: Li$_{1+x}$Me$_{1-x}$O$_2$ (Me: transition metal containing Ni, Co and Mn). In order to obtain a nonaqueous electrolyte secondary battery having a high energy density, the molar content ratio of Li to the transition metal (Me), Li/Me, i.e. (1+x)/(1-x) is 1.0 or more and 1.1 or less.

This lithium transition metal composite oxide can also be represented by, for example, the composition formula: Li(Ni$_a$Co$_b$Mn$_c$)O$_2$ (a+b+c=1).

Since the Ni component contained in the lithium transition metal composite oxide has a property of improving the discharge capacity of the nonaqueous electrolyte secondary battery, the molar ratio of Ni to Me, Ni/Me, i.e. the value of a in the composition formula satisfies 0<a, and is preferably 0.35 or more, more preferably 0.4 or more. The molar ratio Mn/Me is preferably 0.7 or less, more preferably 0.6 or less. The value of a in the composition formula may be 0.58 or less.

For example, a positive active material for a nonaqueous electrolyte secondary battery which includes a lithium transition metal composite oxide in which the molar ratio of Ni to Me, Ni/Me is 0.33, such as NCM 111, has a theoretical energy density of about 600 mWh per unit mass (1 g) of the positive active material when the upper limit potential in charge is set to 4.25 V (vs. Li/Li$^+$), whereas a positive active material for a nonaqueous electrolyte secondary battery which includes a lithium transition metal composite oxide in which the molar ratio of Ni to Me, Li/Me is 0.5, such as LiNi$_{0.5}$Co$_{0.2}$Mn$_{0.3}$O$_2$, has a theoretical energy density of about 650 mWh per unit mass (1 g) of the positive active material when the upper limit potential in charge is set to 4.25 V (vs. Li/Li$^+$). This is because the amount of lithium that can be extracted in the process of charge up to a potential of 4.25 V (vs. Li/Li$^+$), i.e. the value of $\gamma$ when the lithium transition metal composite oxide is expressed as Li$_{1-\gamma}$MeO$_2$ is about 0.5 in NCM 111, whereas the value of $\gamma$ is about 0.7 in LiNi$_{0.5}$Co$_{0.2}$Mn$_{0.3}$O$_2$. Therefore, when a lithium transition metal composite oxide having a large molar ratio of Ni to Me, Ni/Me is used as a positive active material for a nonaqueous electrolyte secondary battery, it is expected that a nonaqueous electrolyte secondary battery excellent in energy density can be provided.

Since the Co component contained in the lithium transition metal composite oxide has an action of the enhancing electron conductivity of active material particles to improve the high rate discharge performance of the nonaqueous electrolyte secondary battery, the molar ratio of Co to Me, Co/Me, i.e. the value of b in the composition formula is preferably 0.1 or more. On the other hand, Co is a metal species which is rare as a global resource, and therefore for reducing the material cost, the value of b is preferably 0.4 or less, more preferably 0.3 or less, and may be 0.

Since the nonaqueous electrolyte secondary battery tends to have excellent charge-discharge cycle performance when the Mn component contained in the lithium transition metal composite oxide is not excessively large, the molar ratio of Mn to Me, Mn/Me, i.e. the value of c in the composition formula is preferably 0.5 or less, more preferably 0.4 or less. On the other hand, Mn is abundant as a global resource, and therefore from the viewpoint of the material cost, the value of c is more than 0, preferably 0.2 or more, more preferably 0.3 or more.

In addition, the lithium transition metal composite oxide according to the present embodiment is not prohibited from containing a small amount of other metals such as alkali metals such as Na and K, alkaline earth metals such as Mg and Ca, and transition metals typified by 3d transition metals such as Fe and Zn as long as the effects of the present invention are not impaired.

<Crystal Structure of Lithium Transition Metal Composite Oxide>

The lithium transition metal composite oxide according to the first embodiment has an $\alpha$-NaFeO$_2$ structure. The lithium transition metal composite oxide is attributed to a space group R3-m both after synthesis (before charge-discharge) and after charge-discharge. Incidentally, "R3-m" should otherwise be denoted by affixing a bar "-" above "3" of "R3m".

The lithium transition metal composite oxide has a diffraction peak indexed to the (104) plane at 2θ=44±1° and a diffraction peak indexed to the (003) plane at 2θ=18.6±1° when the space group R3-m is used for a crystal structure model on the basis of an X-ray diffraction (using a CuK$\alpha$ radiation source) pattern, and the ratio of FWHM (003), which is the full width at half maximum of a diffraction peak of the (003) plane, to FWHM (104), which is the full width at half maximum of a diffraction peak of the (104) plane ("ratio of full width at half maximum (003)/(104)") is 0.810 to 0.865.

The ratio of the full width at half maximum (003)/(104) is a value related to the ratio of the size of a crystallite in a direction perpendicular to the (003) plane to the size of a crystallite in a direction perpendicular to the (104) plane, and therefore gives an index of isotropy of the crystal. When this value is 0.94, the crystal is substantially isotropic. A larger value indicates that the crystal grows large in a direction perpendicular to the (104) plane, and a smaller value indicates that the crystal grows large in a direction perpendicular to the (003) plane ((003) direction). The FWHM (104) is a parameter indicating crystallographically stereoscopic crystallinity, and the smaller the FWHM (104) is, the smaller the grid distortion is throughout the crystal.

Therefore, it is assumed that since the ratio of the full width at half maximum (003)/(104) is 0.810 to 0.865 in the lithium transition metal composite oxide according to the first embodiment, an active material is obtained which has moderate anisotropy and little grid distortion throughout the crystal, and is therefore unlikely to be cracked, and is excellent in charge-discharge cycle performance. For obtaining a higher discharge capacity, the ratio of the full width at half maximum (003)/(104) is preferably 0.83 to 0.855.

As will be described later, the crystallite size mentioned in the present specification is calculated by performing whole powder pattern fitting (WPPF) analysis on diffraction peaks observed at 2θ ranging from 10° to 80°. The crystallite size of the lithium transition metal composite oxide is 410 Å or more. This indicates that overall crystal growth as well as crystal growth in a direction perpendicular to the (003) plane and the (104) plane is good, and therefore it is assumed that a good effect is produced on charge-discharge cycle performance. However, the crystallite size is preferably 500 Å or less, more preferably 460 Å or less because a high discharge capacity can be obtained when the crystallite size is not excessively large.

<Total Pore Volume of Lithium Transition Metal Composite Oxide>

It is preferable that the lithium transition metal composite oxide according to the first embodiment has a total pore volume of 5.0 $mm^3$/g or more. It is considered that when the total pore volume is large, charge-discharge cycle performance can be improved by absorbing a volume change with charge-discharge, and a large discharge capacity is obtained because the contact area with an electrolyte solution increases.

In the present specification, the pore distribution obtained under the measurement conditions described later is evaluated, and the value of the cumulative pore volume at pore sizes ranging from 2 nm to 200 nm is taken as a total pore volume ($mm^3$/g).

<Method for Producing Lithium Transition Metal Composite Oxide>

Another aspect of the present invention (hereinafter, referred to as a "second embodiment") is a method for producing the positive active material for a nonaqueous electrolyte secondary battery which contains a lithium transition metal composite oxide according to the first embodiment, the method including supplying an aqueous solution containing halogen ions, ammonium ions and Ni, Co and Mn as transition metals (Me) to a reaction tank; preparing a carbonate precursor containing Ni, Co and Mn; and firing a mixture of the carbonate precursor and a lithium compound to obtain a lithium transition metal composite oxide.

Basically, the lithium transition metal composite oxide can be obtained by preparing a raw material containing metal elements (Li, Ni, Co and Mn) forming an active material in accordance with the composition of a desired active material (oxide) and firing the raw material.

For preparation of a composite oxide having a desired composition, a so-called "solid phase method" in which raw material powders of Li, Ni, Co and Mn are mixed and fired, and a "coprecipitation method" in which a coprecipitation precursor with Ni, Co and Mn made to exist in one particle is prepared in advance, and a Li salt is mixed therewith and fired are known. In the synthesis process based on the "solid phase method", particularly Mn is difficult to uniformly solid-dissolve with Ni and Co, and therefore it is difficult to obtain a composite oxide with the elements uniformly distributed in one particle. Thus, a phase uniform at an atomic level is more easily obtained when the "coprecipitation method" is selected.

In the second embodiment, the "coprecipitation method" is employed, and a raw material aqueous solution containing ammonium ions and halogen ions together with Ni, Co, and Mn which are transition metal elements is added dropwise to a reaction tank and supplied, whereby a compound containing Ni, Co and Mn is coprecipitated in the reaction solution to prepare a carbonate precursor.

Patent Document 7 discloses a production method, in preparation of a coprecipitation hydroxide precursor, ammonium ions and fluorine ions are added to a solution in a reaction tank in advance, and a raw material aqueous solution containing Ni, Co and Mn which are transition metal elements is added dropwise to the reaction tank. In the method disclosed in Patent Document 7, the amount of halogen ions and ammonium ions is reduced by consumption in the reaction tank as the ammonia complex reaction proceeds.

In contrast, in the second embodiment described in the present specification, the raw material aqueous solution containing the transition metal elements contains ammonium ions and halogen ions before being added dropwise to the reaction tank. In this method, it is considered that the ammonia complex forming reaction already proceeds in the raw material aqueous solution before dropwise addition to the reaction tank because the raw material aqueous solution contains ammonium ions, and the ammonia complex ions are aggregated because the raw material aqueous solution contains halogen ions. Supply of this raw material aqueous solution to the reaction tank prevents a situation in which the amount of halogen ions and ammonium is reduced by consumption in the reaction tank as the ammonia complex reaction proceeds as in the method described in Patent Literature 7, and thus a sufficient amount of ammonia complex ions can be supplied until the end of the reaction.

Therefore, it is considered that a coprecipitation carbonate precursor is obtained which is different in direction of crystal growth from a coprecipitation carbonate precursor prepared by a conventional method and has little grid distortion throughout the crystal.

Figure 2:
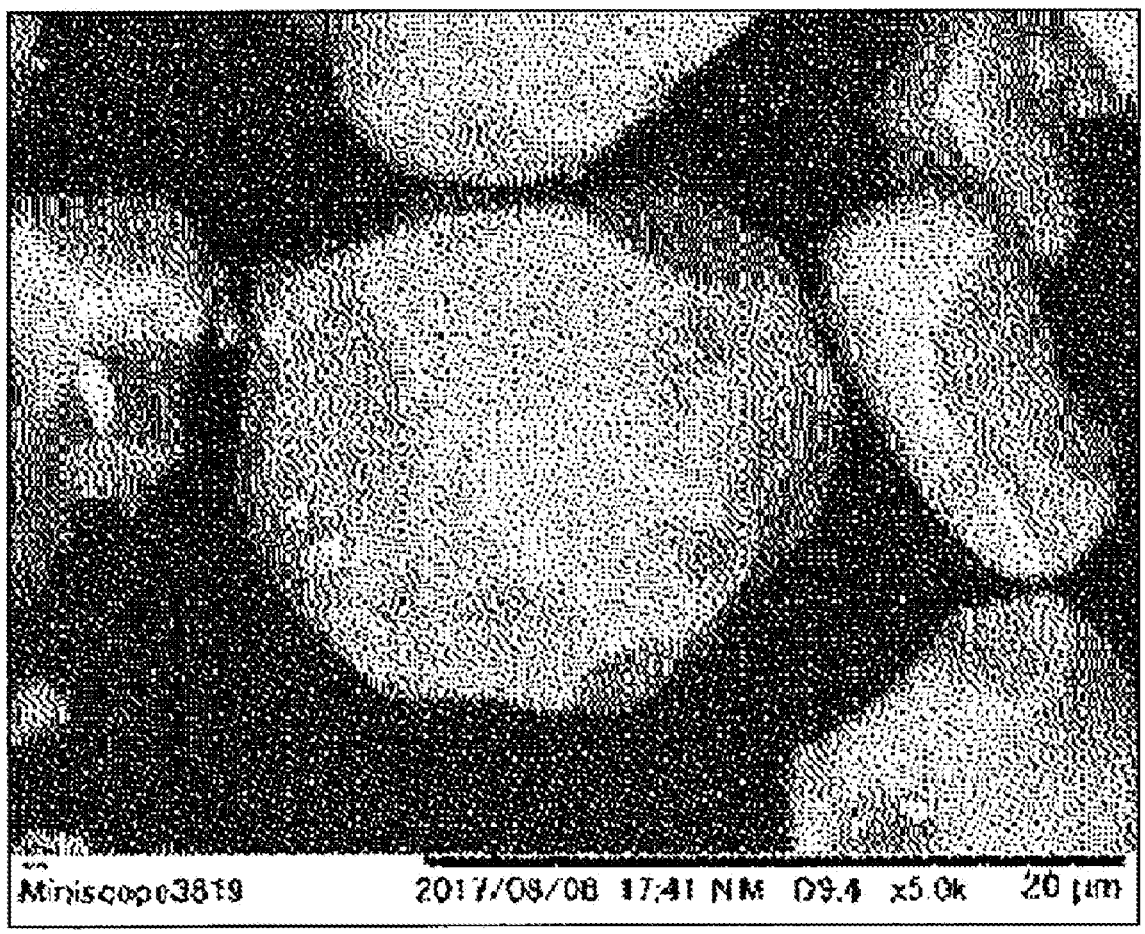
FIG. 2 is a photograph of lithium transition metal composite oxide particles prepared by a method according to a conventional art.
Figure 3:
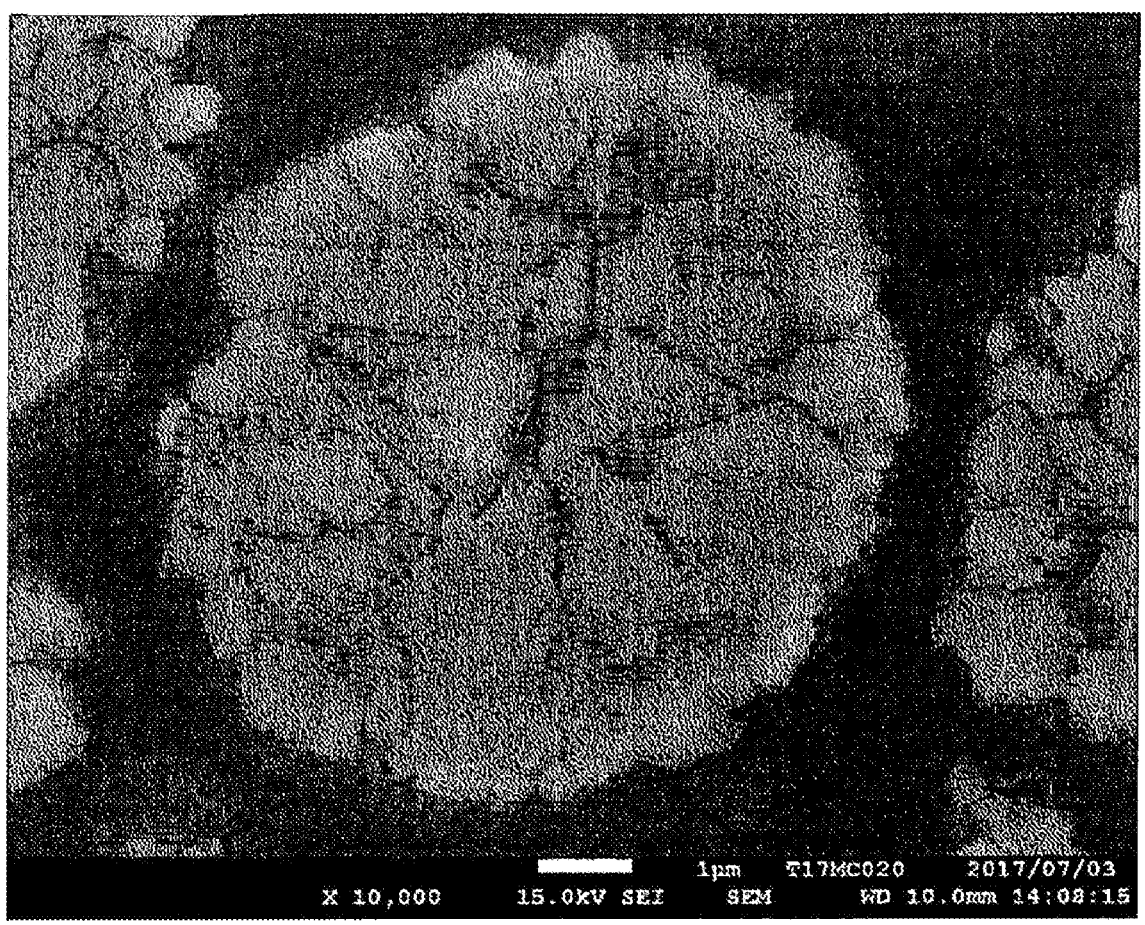
FIG. 3 is a photograph of lithium transition metal composite oxide particles according to a conventional art after 300 charge-discharge cycles.

Patent Documents 5 to 7 disclose a method for producing a lithium transition metal composite oxide using a hydroxide precursor, and the properties of lithium transition metal composite oxide particles vary depending on whether a hydroxide precursor is used or a carbonate precursor is used. FIG. 1 shows lithium transition metal composite oxide particles prepared using a carbonate precursor (related to Example 1 described later), and FIG. 2 shows particles prepared using a hydroxide precursor (related to Comparative Example 16 described later). It is considered that when a carbonate precursor is used, particles having gaps between primary particles and having a large total pore volume are formed, so that charge-discharge cycle performance can be improved by absorbing a volume change with charge-discharge, and a large discharge capacity is obtained because reactivity with an electrolyte solution increases.

In contrast, when a hydroxide precursor is used, there are few pores inside the particles.

Examples of the Ni source contained in the raw material aqueous solution of the coprecipitation precursor include nickel hydroxide, nickel carbonate, nickel sulfate, nickel nitrate and nickel acetate, examples of the Co source contained in the raw material aqueous solution include cobalt sulfate, cobalt nitrate and cobalt acetate, and examples of the Mn source contained in the raw material aqueous solution include manganese oxide, manganese carbonate, manganese sulfate, manganese nitrate and manganese acetate.

For obtaining a raw material aqueous solution in which ammonium ions and halogen ions coexist, an ammonium compound capable of generating ammonium ions and a halogen compound capable of generating halogen ions can be used. The halogen ion is preferably a fluoride ion or a chloride ion. These compounds may be compounds capable of generating ammonium ions and halogen ions in parallel. Examples of the compound that generates chloride ions and ammonium ions include ammonium chloride ($NH_4Cl$), and examples of the compound that generates fluoride ions and ammonium ions include ammonium fluoride ($NH_4F$).

For the concentration of ammonium ions contained in the raw material aqueous solution, the lower limit of the molar content ratio NH4/ Me of ammonium ions to the transition metal Me is preferably 0.0250, more preferably 0.0625. The upper limit is preferably 0.2000, more preferably 0.1000.

For the concentration of halogen ions contained in the raw material aqueous solution, the lower limit of the molar content ratio of halogen ions to the transition metal Me (e.g. Cl/Me or F/Me) is preferably 0.0250, more preferably 0.0625. The upper limit is preferably 0.2000, more preferably 0.1000.

When the molar content ratio of halogen ions to the transition metal Me is set to the above-described concentration, the amount of the halogen ion in the precursor is not excessive, and it is possible to reduce the possibility that at the time when the precursor is mixed with a lithium compound and the mixture is fired, a process in which the molten lithium compound enters the inside of the precursor and diffuses is inhibited by the halogen ions. In such a case, the ratio of the full width at half maximum (003)/(104) and the crystallite size can be set within appropriate ranges.

In preparation of a coprecipitated precursor, Mn, among Ni, Co and Mn, is easily oxidized, so that it is not easy to prepare a coprecipitated precursor in which Ni, Co and Mn are uniformly distributed in a divalent state, and therefore uniform mixing of Ni, Co and Mn at an atomic level is likely to be insufficient. Therefore, it is preferable to remove dissolved oxygen from the solution in the reaction tank for suppressing the oxidation of Mn distributed in the coprecipitation precursor. Examples of the method for removing dissolved oxygen include a method in which the solution is bubbled with a gas free of oxygen ($O_2$). The gas not containing oxygen ($O_2$) is not limited, and carbon dioxide ($CO_2$) or the like can be used.

The pH of the solution in the step of preparing a carbonate precursor by coprecipitating a compound containing Ni, Co and Mn in the solution in the reaction tank can be 7.5 to 11. When the pH to 9.4 or less, the tap density of the precursor can be set to 1.25 g/cm$^3$ or more, and high rate discharge performance can be improved. Further, when the pH is 8.0 or less, the particle growth rate can be increased, so that the stirring duration after the end of dropwise addition of the raw material aqueous solution can be shortened.

For ensuring that the pH of the solution in the reaction tank is maintained constant, it is preferable that a mixed alkali solution containing a complexing agent and a reducing agent is added dropwise to the reaction tank during the period between the start and the end of dropwise addition of the raw material aqueous solution.

As the complexing agent, ammonia, ammonium sulfate, ammonium nitrate or the like can be used, and ammonia is preferable. A precursor having a higher tap density can be prepared by a crystallization reaction using a complexing agent.

Since the complexing agent is also supplied from a compound which is added to the raw material aqueous solution and is capable of generating ammonia, the concentration of the complexing agent added dropwise to the reaction tank can be adjusted in accordance with the concentration of the compound added to the raw material aqueous solution.

A carbonate precursor can be coprecipitated by adding dropwise a mixed alkali solution containing a carbonate aqueous solution to a reaction tank together with a raw material aqueous solution containing the transition metal (Me). The carbonate aqueous solution is preferably a sodium carbonate aqueous solution, a potassium carbonate aqueous solution, a lithium carbonate aqueous solution, or the like.

The dropwise addition rate of the raw material aqueous solution has a significant effect on the uniformity of the distribution of elements in one particle of a coprecipitation precursor generated. The preferred dropwise addition rate depends on the size of a reaction tank, stirring conditions, pH, the reaction temperature and the like, and the dropwise addition rate is preferably 30 mL/min or less. For improving the discharge capacity, the dropwise addition rate is more preferably 10 mL/min or less, most preferably 5 mL/min or less.

The preferred stirring duration after the end of dropwise addition of the raw material aqueous solution depends on the size of a reaction tank, stirring conditions, pH, the reaction temperature and the like, and the stirring duration is preferably 0.5 h or more, more preferably 1 h or more for growing precursor particles as uniform spherical particles. In addition, for reducing the possibility that the particle size becomes too large to obtain sufficient power performance of the nonaqueous electrolyte secondary battery in a low SOC (state of charge) region, the time is preferably 24 h or less, more preferably 10 h or less, most preferably 5 h or less.

It is preferable that after the stirring is stopped, the generated coprecipitation precursor is separated, washed with ion-exchange water, and then dried at 80° C. to 100° C. under normal pressure in an air atmosphere. If necessary, the particle sizes may be equalized by grinding as necessary.

The lithium transition metal composite oxide according to the first embodiment can be produced by mixing the carbonate precursor prepared by the above-described method with a lithium compound, and firing the mixture.

By this production method, a positive active material for a nonaqueous electrolyte secondary battery which contains a lithium transition metal composite oxide having an $\alpha$-NaFeO$_2$ structure, a ratio of full width at half maximum (003)/(104) of 0.810 to 0.865 and a crystallite size of 410 Å or more can be obtained.

As the lithium compound, lithium fluoride, lithium sulfate or lithium phosphate may be used as a sintering aid together with lithium hydroxide or lithium carbonate which is normally used. By performing firing in the presence of a sintering aid such as lithium fluoride, a lithium transition metal composite oxide having higher crystallinity can be obtained. The ratio of such a sintering aid added is preferably 1 to 10 mol % based on the total molar amount of the lithium compounds. The total molar amount of the lithium compounds is preferably excessive by about 1 to 5 mol % in anticipation of loss of a part of the lithium compounds during firing. The lithium transition metal composite oxide produced using such a sintering aid contains a F, S or P element on the particle surface. It can be confirmed by energy dispersive X-ray analysis (EDX) that the lithium transition metal composite oxide contains a F, S or P element on the particle surface. In examples described below, the sintering aid was not used because an active material having sufficiently high crystallinity can be obtained without using a sintering aid such as lithium fluoride.

The firing temperature has an effect on the charge-discharge cycle performance of the active material.

If the firing temperature is excessively low, there is a tendency that crystallization does not sufficiently proceed, and thus charge-discharge cycle performance is deteriorated. In the second embodiment, the firing temperature is preferably higher than 800° C. When the firing temperature is higher than 800° C., the crystal growth can be enhanced to obtain a crystal in which full width at half maximum FWHM (104) of a diffraction peak of the active material is small and small distortions are removed, and the ratio of the full width at half maximum (003)/(104), which is an index of anisotropy of crystal growth, can be set to 0.810 to 0.865, so that occurrence of cracking of the active material can be suppressed to improve charge-discharge cycle performance.

On the other hand, if the firing temperature is excessively high, a structural change from the $\alpha$-$NaFeO_2$ structure to a rock salt type cubic crystal structure occurs, so that movement of lithium ions in the active material during the charge-discharge reaction is disadvantaged, resulting in deterioration of charge-discharge cycle performance. In the second embodiment, the firing temperature is preferably lower than 900° C. When the temperature is lower than 900° C., occurrence of cracking of the active material can be suppressed to improve charge-discharge cycle performance.

Therefore, when the positive active material containing a lithium transition metal composite oxide according to the present embodiment is prepared, the firing temperature is preferably higher than 800° C. and lower than 900° C. for improving charge-discharge cycle performance.

<Positive Electrode for Nonaqueous Electrolyte Secondary Battery>

Still another embodiment of the present invention is a positive electrode for a nonaqueous electrolyte secondary battery which contains the positive active material according to the first embodiment (hereinafter, referred to as a "third embodiment").

It is preferable that the powder of the positive active material preferably has an average particle size (D50) of 100 μm or less. In particular, the average particle size is preferably 50 μm or less for improving the power performance of the nonaqueous electrolyte secondary battery, and preferably 3 μm or more for maintaining charge-discharge cycle performance. A crusher and a classifier are used to obtain the powder in a predetermined shape. For example, a mortar, a ball mill, a sand mill, a vibratory ball mill, a planetary ball mill, a jet mill, a counter jet mill, a whirling airflow type jet mill, a sieve or the like is used. At the time of crushing, wet type crushing in the presence of water or an organic solvent such as hexane can also be used. A classification method is not particularly limited. A sieve or an air classifying apparatus may be employed as necessary for powders subjected to pulverization both in dry manner and in wet manner.

The positive electrode may contain a conductive agent, a binder, a thickener, a filler and the like as other constituent components in addition to the positive active material as a main constituent component.

The conductive agent is not limited as long as it is an electron conductive material which does not cause an adverse effect on the battery characteristics. Usually, one or a mixture of conductive materials such as natural graphite (scaly graphite, flaky graphite, earthy graphite, and the like), artificial graphite, carbon black, acetylene black, ketjen black, carbon whisker, carbon fibers, metal (copper, nickel, aluminum, silver, gold, and the like) powder, metal fibers, and conductive ceramic materials can be contained as the conductive agent.

Among these, acetylene black is preferable as the conductive agent from the viewpoints of electron conductivity and coatability. The amount of the conductive agent to be added is preferably 0.1% by weight to 50% by weight and particularly preferably 0.5% by weight to 30% by weight based on a total weight of the positive electrode. Especially, use of acetylene black after pulverized into ultrafine particles with a diameter of 0.1 to 0.5 μm is preferable since the amount of carbon to be needed can be lessened. These mixing methods are physical mixing methods, and uniform mixing is preferable. For this purpose, a powder mixing apparatus such as a V-type mixing apparatus, an S-type mixing apparatus, an attriter, a ball mill, or a planetary ball mill can be used to perform mixing in a dry manner or a wet manner.

As the binder, usually, thermoplastic resins such as polytetrafluoroethylene (PTFE), polyvinylidene fluoride (PVDF), polyethylene and polypropylene, and polymers having rubber elasticity, such as ethylene-propylene-diene terpolymers (EPDM), sulfonated EPDM, styrene butadiene rubber (SBR) and fluororubber can be used alone or as a mixture of two or more thereof. The amount of the binder to be added is preferably 1 to 50% by weight and particularly preferably 2 to 30% by weight based on the total weight of the positive electrode.

The filler is not limited as long as it is a material that does not adversely affect the battery performance. Usually, olefin polymers such as polypropylene and polyethylene, amorphous silica, alumina, zeolites, glass, carbon, and the like are used. The amount of the filler to be added is preferably 30% by weight or less based on the total weight of the positive electrode.

The positive electrode is preferably produced by mixing a positive active material as the main constituent component and other materials to obtain a composite, mixing the composite with an organic solvent such as N-methylpyrrolidone or toluene, or water, then applying or pressure-bonding the obtained mixture solution onto a current collector as described below in detail, and carrying out heat treatment at a temperature of about 50° C. to 250° C. for about 2 hours. With respect to the above-described application method, it is preferable, for example, to carry out application in an arbitrary thickness and an arbitrary shape by using a technique such as roller coating with an applicator roller, screen coating, doctor blade coating, spin coating, or a bar coater; however the method is not limited to these examples.

As the material of the positive electrode substrate, a metal such as aluminum, titanium, tantalum, or stainless steel, or an alloy thereof is used. An aluminum foil is preferable as the positive electrode substrate. The thickness of the positive electrode substrate is preferably 10 to 30 μm. The thickness of the positive composite layer is preferably 40 to 150 μm (excluding the thickness of the positive electrode substrate) after pressing.

<Nonaqueous Electrolyte Secondary Battery>

Still another embodiment of the present invention is a nonaqueous electrolyte secondary battery including the positive electrode according to the third embodiment, a negative electrode and a nonaqueous electrolyte (hereinafter, referred to as a "fourth embodiment"). Hereinafter, Elements of the battery, other than the positive electrode" will be described in detail.

<<Negative Electrode>>

A negative electrode material as a main constituent component of a negative electrode is not limited, and any negative electrode material may be selected as long as it can release or store lithium ions. Examples thereof include titanium-based materials such as lithium titanate having a spinel crystal structure typified by $Li[Li_{1/3}Ti_{5/3}]O_4$, alloy-based materials such as Si-based materials, Sb-based materials and Sn-based materials, lithium metals, lithium alloys (lithium metal-containing alloys such as lithium-silicon, lithium-aluminum, lithium-lead, lithium-tin, lithium-aluminum-tin, lithium-gallium and wood's alloy), lithium composite oxides (e.g. lithium-titanium composite oxides such as $LiTiO_2$), silicon oxide, alloys capable of storing and releasing lithium, and carbon materials (e.g. graphite, hard carbon, lower temperature calcined carbon and amorphous carbon).

The negative electrode material is preferably powder, and like the positive electrode, the negative electrode may contain a conductive agent, a binder, a thickener, a filler and the like as other constituent components in addition to the negative electrode material.

As the negative electrode substrate, a metal foil can be used, and a copper foil is preferable.

<<Nonaqueous Electrolyte>>

The nonaqueous electrolyte used for a nonaqueous electrolyte secondary battery according to the fourth embodiment is not limited, and nonaqueous electrolytes that are generally proposed to be used in lithium batteries and the like can be used. Examples of a nonaqueous solvent to be used for the nonaqueous electrolyte include cyclic carbonic acid esters such as propylene carbonate, ethylene carbonate, butylene carbonate, chloroethylene carbonate, and vinylene carbonate; cyclic esters such as γ-butyrolactone, and γ-valerolactone; chain carbonates such as dimethyl carbonate, diethyl carbonate and ethyl methyl carbonate; chain esters such as methyl formate, methyl acetate, and methyl butyrate; tetrahydrofuran and derivatives thereof; ethers such as 1,3-dioxane, 1,4-dioxane, 1,2-dimethoxyethane, 1,4-dibutoxyethane, and methyl diglyme; nitriles such as acetonitrile, and benzonitrile; and dioxolane and derivatives thereof, and these compounds may be used alone or two or more of them may be used in the form of a mixture; however, the nonaqueous solvent is not limited to these examples.

Additives may be added to the nonaqueous electrolyte. Examples of the additives include vinylidene carbonate; sulfur-containing compounds such as ethylene sulfide, 1,3-propenesultone, diglycol sulfate, 1,3-propanesultone (PS), 1,4-butanesultone, 2,4-butanesultone, sulfolane, ethylene glycol cyclic sulfate and propylene glycol cyclic sulfate; phosphorus-containing compounds such as lithium difluorophosphate; and cyan-based compounds such as adiponitrile and succinonitrile. The amount of these compounds added in the nonaqueous electrolyte is preferably 0.5 to 2% by mass.

Examples of an electrolyte salt to be used for the nonaqueous electrolyte include inorganic ion salts containing one of lithium (Li), sodium (Na), and potassium (K) such as $LiClO_4$, $LiBF_4$, $LiAsF_6$, $LiPF_6$, LiSCN, LiBr, LiI, $Li_2SO_4$ $Li_2B_{10}Cl_{10}$, $NaClO_4$, NaI, NaSCN, NaBr, $KClO_4$, and KSCN and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfonate, lithium octylsulfonate, and lithium dodecylbenzenesulfonate, and these ionic compounds may be used alone or two or more of them may be used in the form of a mixture.

Further, use of $LiPF_6$ or $LiBF_4$ and a lithium salt having a perfluoroalkyl group such as $LiN(C_2F_5SO_2)_2$ in the form of a mixture can further lower the viscosity of the electrolyte. Therefore, the low temperature performance can be further improved, and self discharge can be suppressed. Consequently, use of such a mixture is more desirable.

A room temperature molten salt or an ionic liquid may be used as the nonaqueous electrolyte.

The concentration of the electrolyte salt in the nonaqueous electrolyte is preferably 0.1 $mol/dm^3$ to 5 $mol/dm^3$, more preferably 0.5 $mol/dm^3$ to 2.5 $mol/dm^3$ for reliably obtaining a nonaqueous electrolyte secondary battery having high battery performance.

<<Separator>>

As a separator to be used for the nonaqueous electrolyte secondary battery according to the fourth embodiment, porous membranes, nonwoven fabrics, and the like showing excellent high rate discharge performance are preferably used alone or in combination. Examples of a material constituting a separator for a nonaqueous electrolyte battery include polyolefin resins typified by polyethylene and polypropylene; polyester resins typified by poly(ethylene terephthalate) and poly(butylene terephthalate); poly(vinylidene fluoride), vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

Porosity of the separator is preferably 98% by volume or less from the viewpoint of strength. The porosity is preferably 20% by volume or more from the viewpoint of the charge-discharge performance of the nonaqueous electrolyte secondary battery.

Further, as the separator, a polymer gel comprised of, for example, acrylonitrile, ethylene oxide, propylene oxide, methyl methacrylate, vinyl acetate, vinylpyrrolidone, a polymer such as poly(vinylidene fluoride) with an electrolyte may be used. Use of the nonaqueous electrolyte in the gel state as described above is preferable in terms of an effect of preventing liquid leakage.

Further, use of the finely porous membranes or nonwoven fabrics as described above in combination with the polymer gel for the separator is preferable because of improvement of a liquid retention property of the electrolyte. That is, a film is formed by coating the surface and fine pore wall faces of a polyethylene finely porous membrane with a solvophilic polymer in a thickness of several μm or thinner, and the electrolyte is maintained in the fine pores of the film, and thus causing gelation of the solvophilic polymer.

Examples of the solvophilic polymer include, in addition to polyvinylidene fluoride, polymers obtained by crosslinking acrylate monomers having ethylene oxide groups, ester groups, or the like, epoxy monomers, monomers having isocyanato groups, and the like. The monomer can be subjected to a crosslinking reaction by performing heating or using an ultraviolet ray (UV) while using a radical initiator, or by using an actinic ray such as an electron beam (EB).

Other components of a battery include a terminal, an insulating plate, a battery case and the like, and for these parts, the parts used heretofore may be used as-is.

<<Construction of Nonaqueous Electrolyte Secondary Battery>>

Figure 4:
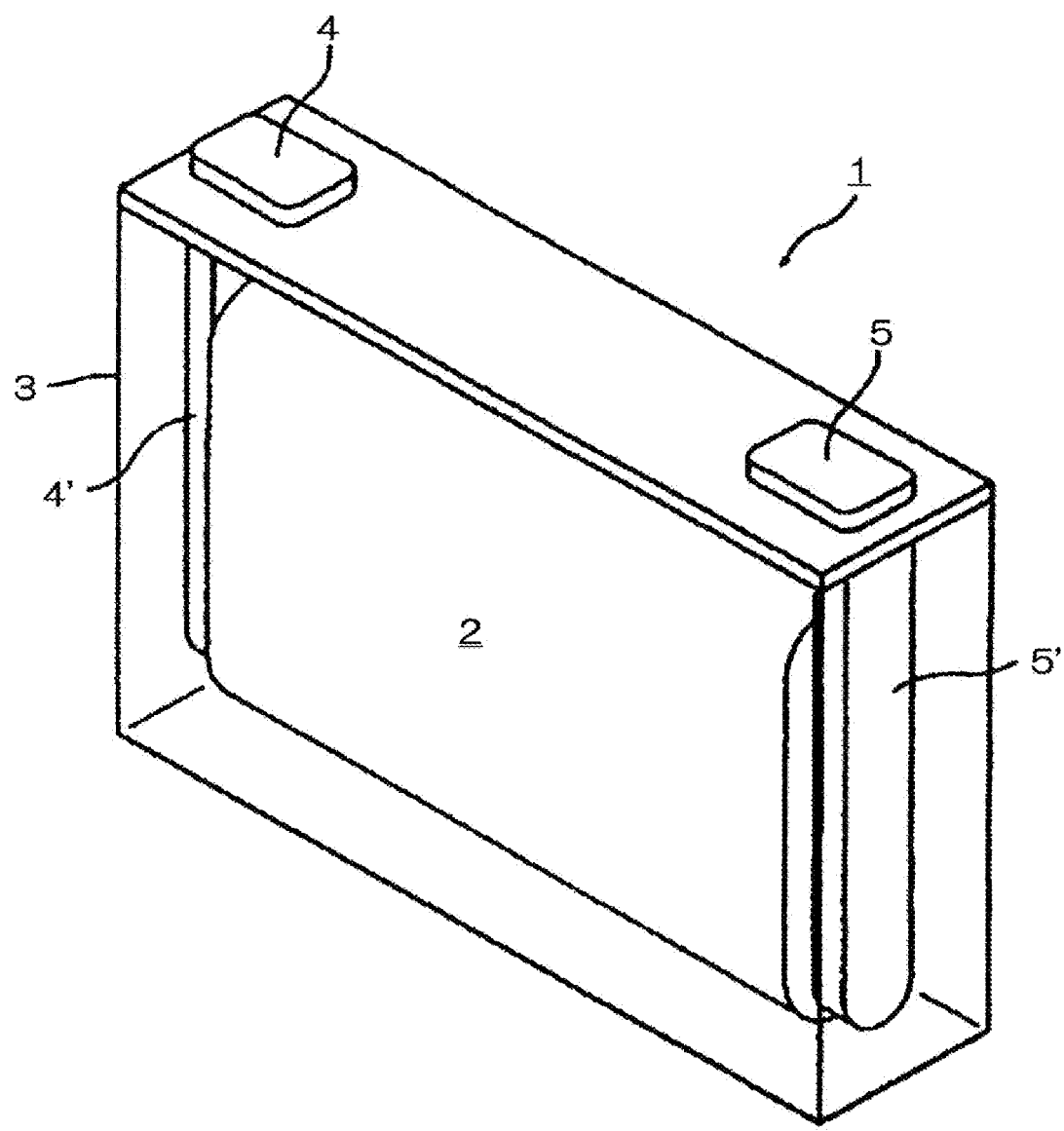
FIG. 4 is a perspective view showing a nonaqueous electrolyte secondary battery according to an embodiment of the present invention.

FIG. 4 shows the nonaqueous electrolyte secondary battery including a positive electrode containing a positive active material according to the fourth embodiment. FIG. 4 is a perspective view showing the inside of a case of a rectangular nonaqueous electrolyte secondary battery. A nonaqueous electrolyte secondary battery 1 is constructed by injecting a nonaqueous electrolyte (electrolyte solution) into a battery case 3 containing an electrode group 2. The electrode group 2 is formed by winding a positive electrode, including a positive active material, and a negative electrode, including a negative active material, with a separator interposed between the electrodes. The positive electrode is electrically connected to a positive electrode terminal 4 through a positive electrode lead 4', and the negative electrode is electrically connected to a negative electrode terminal 5 through a negative electrode lead 5'.

The shape of the nonaqueous electrolyte secondary battery is not particularly limited, and examples include cylindrical batteries, prismatic batteries (rectangular batteries) and flat batteries.

Figure 5:
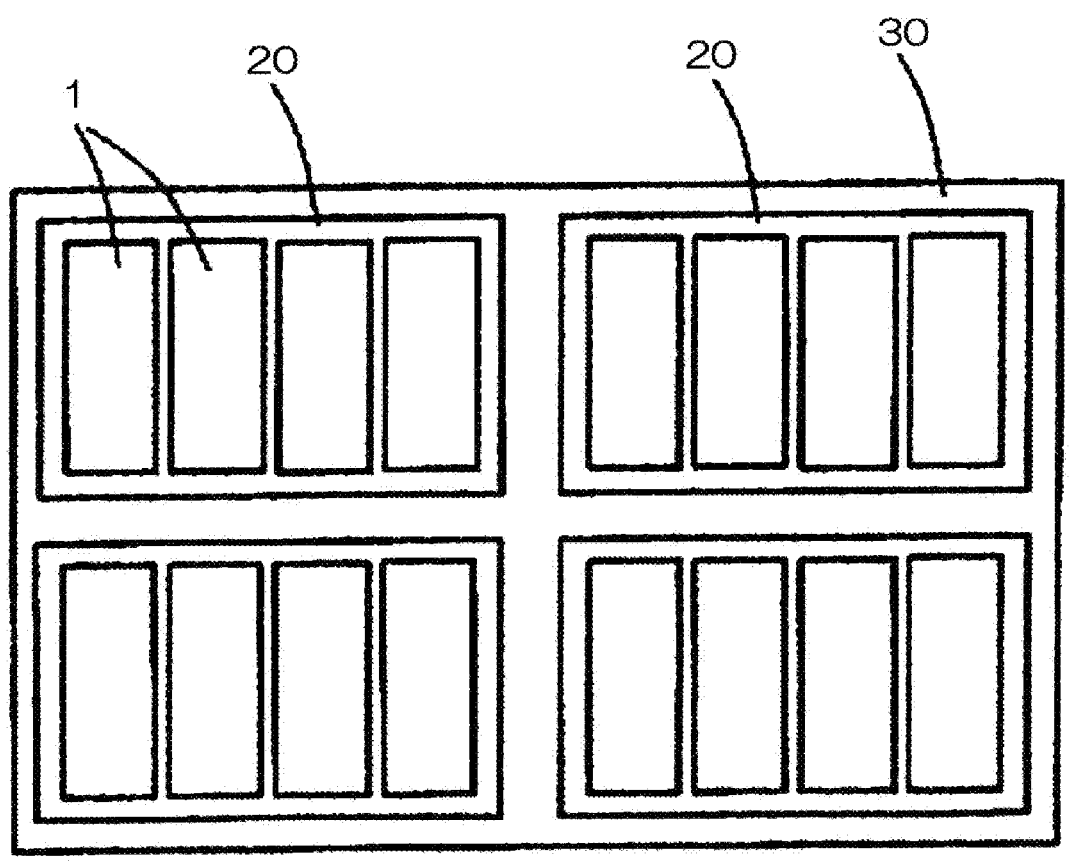
FIG. 5 is a schematic view showing an energy storage apparatus including a plurality of nonaqueous electrolyte secondary batteries according to an embodiment of the present invention.

A plurality of nonaqueous electrolyte secondary batteries according to the fourth embodiment can be assembled into an energy storage apparatus (hereinafter, referred to as a "fifth embodiment".). FIG. 5 shows an example of an energy storage apparatus according to the fifth embodiment. In FIG. 5, an energy storage apparatus 30 includes a plurality of energy storage units 20. Each of the energy storage units 20 includes a plurality of the nonaqueous electrolyte secondary batteries 1. The energy storage apparatus 30 can be mounted as a power source for an automobile such as an electric vehicle (EV), a hybrid vehicle (HEV), a plug-in hybrid vehicle (PHEV), or the like.

Measurement methods for the positive active material for a nonaqueous electrolyte secondary battery will now be described.

<Object to be Measured>

When a sample is lithium transition metal composite oxide powder before preparation of a positive electrode (powder before charge-discharge), the sample is subjected to measurement as it is.

When a sample is collected from a positive electrode taken out from a disassembled battery, before the battery is disassembled, constant current discharge is performed up to a battery voltage, which is the lower limit of a designated voltage, at a current value (0.1 C) that is 1/10 of a current value giving an amount of electricity equal to a nominal capacity of the battery when the battery is energized at a constant current for 1 hour. The battery is disassembled, the positive electrode is taken out, a battery having a metal lithium electrode as a counter electrode is assembled, and constant current discharge is performed at a current value of 10 mA per g of a positive composite until the voltage between terminals becomes 2.0 V, so that the battery is adjusted to a fully discharged state. The battery is disassembled again, and the positive electrode is taken out. The positive electrode taken out from the battery is sufficiently washed with dimethyl carbonate to remove a nonaqueous electrolyte attached on the positive electrode, and is dried at room temperature for an entire day and night, and the positive composite on a positive electrode substrate is then collected. The operations from the disassembly to re-disassembly of the battery, and the washing and drying operations of the positive electrode plate are performed in an argon atmosphere having a dew point of −60° C. or lower.

<X-Ray Diffraction Measurement>

In the present specification, X-ray diffraction measurement and measurement of the full width at half maximum using the X-ray diffraction measurement are performed under the following conditions. A ray source is CuKα, an acceleration voltage is 30 kV, and an acceleration current is 15 mA. A sampling width is 0.01 deg, a scanning time is 14 minutes (scanning speed is 5.0), a divergence slit width is 0.625 deg, a light receiving slit is open, and a scattering slit width is 8.0 mm.

<Measurement of Ratio of Full Width at Half Maximum and Crystallite Size>

The ratio of the full width at half maximum and the crystallite size are calculated by applying "PDXL (Ver 1.8.1.0)" from Rigaku Corporation, which is software attached to the X-ray diffractometer, to data obtained by X-ray diffraction measurement.

A "ratio of the full width at half maximum (003)/(104)" is obtained by dividing the full width at half maximum FWHM (003) of a diffraction peak present at $2\theta=18.6\pm1°$, which is a peak indexed to the (003) plane when attributed to a space group R3-m, by the full width at half maximum FWHM (104) of a diffraction peak present at $2\theta=44\pm1°$, which is a peak indexed to the (104) plane when attributed to the space group R3-m.

In addition, the software is made to read diffraction peaks observed at $2\theta$ ranging from 10° to 80°, including the above-described diffraction peaks, crystal phases are identified (indexed), and WPPF analysis is performed. Refinement is performed so that the error in intensity between a measured pattern and calculated pattern is 1500 or less, and a crystallite size is calculated. In the present specification, the "crystallite size" refers to a crystallite size calculated here.

<Measurement of Total Pore Volume>

1.00 g of powder (lithium transition metal composite oxide) to be measured is put in a sample tube for measurement, and a drying step is continuously carried out in the following stages (1) to (4):

(1) drying under reduced pressure at 30° C. for 0.5 hours;
(2) drying under reduced pressure at 100° C. for 1 hours;
(3) drying under reduced pressure at 120° C. for 6 hours; and
(4) drying under reduced pressure at 180° C. for 6 hours.

Next, by a nitrogen gas adsorption method using liquid nitrogen, isotherms on the adsorption side and the extraction side are measured in a relative pressure P/P0 (P0=about 770 mmHg) range of 0 to 1. Then, the pore distribution is evaluated by calculation by a BJH method using the isotherm on the extraction side.

The value of the cumulative pore volume at pore sizes ranging from 2 nm to 200 nm is taken as a "total pore volume ($mm^3/g$)" mentioned in the present specification.

EXAMPLES

Example 1

<Precursor Preparation Step>

In preparation of a positive active material, a carbonate precursor was prepared by a reaction crystallization method. First, 262.9 g of nickel sulfate hexahydrate, 112.4 g of cobalt sulfate heptahydrate, 144.6 g of manganese sulfate pentahydrate, and 2.7 g of ammonium chloride were weighed, and all dissolved in 2 $dm^3$ of ion-exchange water to prepare a raw material aqueous solution containing a 1.0 M sulfate in which the molar ratio of Ni:Co:Mn was 50:20:30. The molar ratio of the ammonium chloride to the transition metal (Me), $NH_4Cl/Me$ in the raw material aqueous solution is 0.0250. Next, 2 $dm^3$ of ion-exchange water was poured into a 5 $dm^3$ reaction tank, and bubbled with $CO_2$ for 30 minutes to remove oxygen contained in the ion-exchange water. The temperature of the reaction tank was set to 50° C. (±2° C.), and an arrangement was made so as to sufficiently generate a conviction flow in the reaction tank while the contents of the reaction tank was stirred at a rotation speed of 1500 rpm using a paddle impeller equipped with a stirring motor. The raw material aqueous solution was added dropwise to the reaction tank at a rate of $1.6 \times 10^{-3}$ dm$^3$/min for 24 hours. Here, during a period between the start and the end of dropwise addition, a mixed alkali solution including 1.0 M sodium carbonate and 0.175 M ammonia was appropriately added dropwise to perform control so that the pH of the reaction liquid in the reaction tank was 8.0 (±0.1) on a constant basis, and a part of the reaction liquid was discharged by overflow to perform control so that the total amount of the reaction liquid was not more than 2 dm$^3$ on a constant basis. After the end of the dropwise addition, stirring of the contents of the reaction tank was further continued for 1 hour. After the stirring was stopped, the mixture was allowed to stand at room temperature for 12 hours or more. Next, carbonate precursor particles generated in the reaction tank were separated using a suction filtration apparatus, washed with ion-exchange water to remove sodium ions deposited on the particles, and dried at 80° C. for 20 hours under normal pressure in an air atmosphere using a dryer. Thereafter, for equalizing the particle sizes, the particles were ground for several minutes in an automatic mortar made of agate. In this way, a carbonate precursor was prepared.

<Firing Step>

1.259 g of lithium carbonate was added to 3.646 g of the carbonate precursor, and using an automatic mortar made of agate, the mixture was adequately stirred to prepare mixed powder in which the molar ratio of Li:(Ni, Co, Mn) was 110:100. Using a pellet molding machine, the mixed powder was molded at a pressure of 6 MPa to obtain pellets with a diameter of 25 mm. The amount of the mixed powder molded into pellets was determined by performing calculation on the premise that the mass of an expected final product would be 3 g. One of the pellets was placed on an alumina boat having a total length of about 100 mm, the alumina boat was placed in a box-shaped electric furnace (model number: AMF 20), the temperature was raised from room temperature to 850° C. over 10 hours under normal pressure in an air atmosphere, and firing was performed at 850° C. for 4 hours. The box-shaped electric furnace has internal dimensions of 10 cm in length, 20 cm in width and 30 cm in depth, and is provided with heating wires at intervals of 20 cm in the width direction. After the firing, the heater was turned off, and the alumina boat was allowed to cool naturally while being left to stand in the furnace. As a result, the temperature of the furnace decreased to about 200° C. after 5 hours, but the subsequent temperature decrease rate was slightly low. After a lapse of an entire day and night, the temperature of the furnace was confirmed to be 100° C. or lower, and the pellets were then taken out, and ground for several minutes with an automatic mortar made of agate for equalizing the particle sizes. In this way, a lithium transition metal composite oxide $Li_{1.1}(Ni_{0.5}Co_{0.2}Mn_{0.3})_{0.9}O_2$ of Example 1 was prepared.

Example 2

A lithium transition metal composite oxide of Example 2 was prepared similarly to Example 1 except that in the precursor preparation step, the amount of ammonium chloride added to the raw material aqueous solution containing a sulfate was 6.7 g (molar ratio $NH_4Cl/Me=0.0625$), and the concentration of ammonia added to the alkali solution containing sodium carbonate was adjusted to 0.1375 M.

Example 3

A lithium transition metal composite oxide of Example 3 was prepared similarly to Example 1 except that in the precursor preparation step, the amount of ammonium chloride added to the raw material aqueous solution containing a sulfate was 10.7 g (molar ratio $NH_4Cl/Me=0.1000$), and the concentration of ammonia added to the alkali solution containing sodium carbonate was adjusted to 0.1000 M.

Example 4

A lithium transition metal composite oxide of Example 4 was prepared similarly to Example 1 except that in the precursor preparation step, the amount of ammonium chloride added to the raw material aqueous solution containing a sulfate was 21.4 g (molar ratio $NH_4Cl/Me=0.2000$), and ammonia was not added to the alkali solution containing sodium carbonate.

Example 5

A lithium transition metal composite oxide of Example 5 was prepared similarly to Example 1 except that in the precursor preparation step, 1.85 g of ammonium fluoride (molar ratio $NH_4F/Me=0.0250$) was added, instead of ammonium chloride, to the raw material aqueous solution containing a sulfate.

Example 6

A lithium transition metal composite oxide of Example 6 was prepared similarly to Example 5 except that in the precursor preparation step, the amount of ammonium fluoride added to the raw material aqueous solution containing a sulfate was 4.63 g (molar ratio $NH_4F/Me=0.0625$), and the concentration of ammonia added to the alkali solution containing sodium carbonate was adjusted to 0.1375 M.

Comparative Examples 1 to 4

Lithium transition metal composite oxides of Comparative Examples 1 to 4 were prepared similarly to Example 2 except that in the firing step, the firing temperatures were changed to 800° C., 900° C., 950° C. and 1000° C., respectively.

Comparative Examples 5 to 9

Lithium transition metal composite oxides of Comparative Examples 5 to 9 [10]] were prepared similarly to Example 1 except that in the precursor preparation step, $NH_4Cl$ was not added to the raw material aqueous solution containing a sulfate and the concentration of ammonia added to the alkali solution containing sodium carbonate was adjusted to 0.2000 M, and in the firing step, the firing temperatures were changed to 800° C., 850° C., 900° C., 950° C. and 1000° C., respectively.

Comparative Example 10

A lithium transition metal composite oxide of Comparative Example 10 was prepared similarly to Example 5 except that in the precursor preparation step, the amount of ammonium fluoride added to the raw material aqueous solution containing a sulfate was 7.4 g (molar ratio $NH_4F/Me$=0.1000), and the concentration of ammonia added to the alkali solution containing sodium carbonate was adjusted to 0.1000 M.

Comparative Example 11

A lithium transition metal composite oxide of Comparative Example 11 was prepared similarly to Example 5 except that in the precursor preparation step, the amount of ammonium fluoride added to the raw material aqueous solution containing a sulfate was 14.8 g (molar ratio $NH_4F/Me$=0.2000), and ammonia was not added to the alkali solution containing sodium carbonate.

Comparative Examples 12 to 15

Lithium transition metal composite oxides of Comparative Examples 12 to 15 were prepared similarly to Example 6 except that in the firing step, the firing temperatures were changed to 800° C., 900° C., 950° C. and 1000° C., respectively.

Comparative Example 16

<Precursor Preparation Step>
In preparation of an active material, a hydroxide precursor was prepared by a reaction crystallization method. First, 525.7 g of nickel sulfate hexahydrate, 224.9 g of cobalt sulfate heptahydrate, 289.3 g of manganese sulfate pentahydrate, and 9.25 g of ammonium fluoride were weighed, and all of them were dissolved in 4 $dm^3$ of ion-exchange water to prepare a raw material aqueous solution containing a 1.0 M sulfate in which the molar ratio of Ni:Co:Mn was 50:20:30 and ammonium fluoride in which the molar ratio of $NH_4F$ to Me was 0.0625. Next, 2 $dm^3$ of ion-exchange water was poured into a 5 $dm^3$ reaction tank, and bubbled with N2 gas for 30 minutes to remove oxygen contained in the ion-exchange water. The temperature of the reaction tank was set to 50° C. (+2° C.), and an arrangement was made so as to sufficiently generate a conviction flow in the reaction tank layer while the contents of the reaction tank was stirred at a rotation speed of 1500 rpm using a paddle impeller equipped with a stirring motor. The raw material aqueous solution was added dropwise to the reaction tank at a rate of $1.3 \times 10^{-3}$ $dm^3$/min for 50 hours. Here, during a period between the start and the end of dropwise addition, a mixed alkali solution including 4.0 M sodium carbonate, and 0.4375 M ammonia and 0.29 M hydrazine was appropriately added dropwise to perform control so that the pH of the reaction liquid in the reaction tank was 11.0 ($\pm$0.1) on a constant basis, and a part of the reaction liquid was discharged by overflow to perform control so that the total amount of the reaction liquid was not more than 2 $dm^3$ on a constant basis. After the end of the dropwise addition, stirring of the contents of the reaction tank was further continued for 1 hour. After the stirring was stopped, the mixture was allowed to stand at room temperature for 12 hours or more. Next, hydroxide precursor particles generated in the reaction tank were separated using a suction filtration apparatus, washed with ion-exchange water to remove sodium ions deposited on the particles, and dried at 80° C. for 20 hours under normal pressure in an air atmosphere using an electric furnace. Thereafter, for equalizing the particle sizes, the particles were ground for several minutes in an automatic mortar made of agate. In this way, a hydroxide precursor was prepared.

<Firing Step>
1.430 g of lithium hydroxide monohydrate was added to 2.840 g of the hydroxide precursor, and using an automatic mortar made of agate, the mixture was adequately stirred to prepare mixed powder in which the molar ratio of Li:Me (Ni, Co and Mn) was 110:100. Using a pellet molding machine, the mixed powder was molded at a pressure of 6 MPa to obtain pellets with a diameter of 30 mm. The amount of the mixed powder molded into pellets was determined by performing calculation on the premise that the mass of an expected final product would be 3.0 g. One of the pellets was placed on an alumina boat having a total length of about 100 mm, the alumina boat was placed in a box-shaped electric furnace (model number: AMF 20), the temperature was raised from room temperature to 850° C. over 10 hours under normal pressure in an air atmosphere, and firing was performed at 850° C. for 4 hours. The box-shaped electric furnace has internal dimensions of 10 cm in length, 20 cm in width and 30 cm in depth, and is provided with heating wires at intervals of 20 cm in the width direction. After the firing, the heater was turned off, and the alumina boat was allowed to cool naturally while being left to stand in the furnace. As a result, the temperature of the furnace decreased to about 200° C. after 5 hours, but the subsequent temperature decrease rate was slightly low. After a lapse of an entire day and night, the temperature of the furnace was confirmed to be 100° C. or lower, and the pellets were then taken out, and ground for several minutes with an automatic mortar made of agate for equalizing the particle sizes. In this way, a lithium transition metal composite oxide $Li_{1.1}(Ni_{0.5}Co_{0.2}Mn_{0.3})_{0.9}O_2$ of Comparative Example 16 was prepared.

Comparative Example 17

A lithium transition metal composite oxide of Comparative Example 17 was prepared similarly to Comparative Example 16 except that in the precursor preparation step, a hydroxide precursor was prepared using a raw material aqueous solution free of ammonium fluoride, and the concentration of ammonia added to the alkali solution containing sodium carbonate was adjusted to 0.5000 M.

Comparative Example 18

A lithium transition metal composite oxide $Li_{1.025}(Ni_{0.5}Co_{0.2}Mn_{0.3})_{0.975}O_2$ of Comparative Example 18 was prepared similarly to Comparative Example 17 except that in the firing step, the amount of lithium hydroxide monohydrate added to 2.840 g of the hydroxide precursor was 1.366 g, the molar ratio of Li:Me was changed to 105:100, and the firing temperature was 900° C.

Comparative Example 19

A lithium transition metal composite oxide of Comparative Example 19 was prepared similarly to Comparative Example 18 except that ammonium fluoride was added to ion-exchange water in the reaction tank before addition of the raw material aqueous solution. The molar ratio of the ammonium fluoride in the raw material aqueous solution to the transition metal (Me), $NH_4F/Me$ in the ion-exchange water is 0.0625.

<X-Ray Diffraction Measurement, and Calculation of Ratio of Full Width at Half Maximum and Crystallite Size>

For the lithium transition metal composite oxides of Examples 1 to 6 and Comparative Examples 1 to 19, powder X-ray diffraction measurement was performed under the above-described conditions using an X-ray diffractometer (manufactured by Rigaku Corporation, model name: MiniFlexII). All the lithium transition metal composite oxides described above were analyzed using the attached software "PDXL", and were confirmed to have an X-ray diffraction pattern attributable to R3-m, and an $\alpha$-NaFeO$_2$ structure. The ratio of the full width at half maximum (003)/(104) was calculated from the full width at half maximum FWHM (003) of a diffraction peak indexed to the (003) plane and the full width at half maximum FWHM (104) of a diffraction peak indexed to the (104) plane.

Further, the software was made to read diffraction peaks observed at 2θ ranging from 10° to 80°, including the diffraction peaks indexed to the (003) plane and the (104) plane, crystal phases were identified (indexed), and WPPF analysis was performed. Refinement was performed so that the error in intensity between a measured pattern and calculated pattern was 1500 or less, and a crystallite size was calculated.

<Measurement of Total Pore Volume>

For the lithium transition metal composite oxides of Examples 2 and 6 and Comparative Examples 6 and 19, the total pore volume was determined in accordance with the measurement method described above.

<Preparation of Nonaqueous Electrolyte Secondary Battery>

Using the lithium transition metal composite oxides of Examples 1 to 6 and Comparative Examples 1 to 19 as positive active materials, respectively, nonaqueous electrolyte secondary batteries were prepared in the following procedure.

A coating paste was prepared in which the positive active material, acetylene black (AB) and polyvinylidene fluoride (PVdF) were mixed at a mass ratio of 92:4:4 (in terms of a solid content) and dispersed with N-methylpyrrolidone as a dispersion medium. The coating paste was applied to one surface of an aluminum foil positive electrode substrate having a thickness of 20 μm, dried, and pressed to prepare a positive electrode. The mass of the positive active material applied per fixed area and the positive electrode thickness after pressing were adjusted so that test conditions were the same among the nonaqueous electrolyte secondary batteries of all Examples and Comparative Examples.

As the negative electrode, two types of negative electrodes, i.e. a metal lithium negative electrode and a graphite negative electrode, were used.

The metal lithium negative electrode was prepared by bonding metal lithium having a sufficiently large capacity with respect to the theoretical capacity of the positive electrode to a nickel negative electrode substrate.

A graphite negative electrode was prepared by applying a coating paste, in which graphite, styrene-butadiene rubber (SBR) and carboxymethyl cellulose (CMC) were mixed at a mass ratio of 96.7:2.1:1.2 and dispersed with water as a dispersion medium, to one surface of a 10 μm-thick copper foil negative electrode substrate, and performing drying. The amount of the negative active material applied per certain area was adjusted so that the capacity of the battery was not limited by the negative electrode when the negative electrode was combined with the positive electrode.

As a nonaqueous electrolyte, a solution obtained by dissolving LiPF$_6$ at a concentration of 1 mol/dm$^3$ in a mixed solvent in which the volume ratio of ethylene carbonate (EC)/ethyl methyl carbonate (EMC)/dimethyl carbonate (DMC) was 6:7:7 was used. As a separator, a finely porous membrane made of polypropylene, the surface of which was modified with polyacrylate, was used. A metal resin composite film was used for the outer case.

The positive electrode and the metal lithium negative electrode or the graphite negative electrode were laminated with the separator interposed therebetween, and stored in the outer case such that open ends of a positive electrode terminal and a negative electrode terminal were externally exposed. Fusion margins with inner surfaces of the metal resin composite films facing each other were airtightly sealed except a portion forming an electrolyte solution filling hole, and the nonaqueous electrolyte was injected, followed by sealing the electrolyte solution filling hole. In this way, for each of examples and comparative examples, a nonaqueous electrolyte secondary battery having a metal lithium negative electrode as a negative electrode and a nonaqueous electrolyte secondary battery having a graphite negative electrode as a negative electrode were prepared.

<Initial Charge-Discharge Test>

The nonaqueous electrolyte secondary battery including the positive electrode of each of examples and comparative examples and the metal lithium negative electrode was subjected to 2 cycles of initial charge-discharge at 25° C. Charge was constant current constant voltage charge with a current of 0.2 C and a voltage of 4.35 V, and the condition of the end-of-charge was set at a time point at which the current value was reduced to ⅙. Discharge was constant current discharge with a current of 0.2 C and an end voltage of 2.85 V. Here, a rest process of 10 minutes was provided after charge and after discharge respectively, and the discharge capacity at the second cycle was confirmed and divided by the mass of the positive active material contained in the positive electrode to give a "0.2 C discharge capacity (mAh/g)".

<Charge-Discharge Cycle Test>

For evaluating charge-discharge cycle performance, the nonaqueous electrolyte secondary battery including the positive electrode of each of examples and comparative examples and the graphite negative electrode was subjected to the same initial charge-discharge as described above, followed by conducting a 50-cycle charge-discharge cycle test. Charge in the charge-discharge cycle test was constant current constant voltage charge with a current of 1 C and a voltage of 4.25 V, and the condition of the end-of-charge was set at a time point at which the current value was reduced to ⅙. Discharge was constant current discharge with a current of 1 C and an end voltage of 2.75 V. Here, a rest process of 10 minutes was provided after each of charge and discharge. The charge-discharge cycle test was conducted in a thermostatic chamber set at 60° C.

The discharge capacity at the first cycle in the charge-discharge cycle test was divided by the mass of the positive active material contained in the positive electrode to give a "1 C discharge capacity (mAh/g)", and the percentage of a value obtained by dividing the discharge capacity at the 50th cycle by the mass of the positive active material contained in the positive electrode to the 1 C discharge capacity was calculated and defined as a "discharge capacity retention ratio (%)". In the present invention, a battery having a 1C discharge capacity of 140 mAh/g or more and a discharge capacity retention ratio of 88% or more was determined as being excellent in charge-discharge cycle performance.

Table 1 shows the molar ratio of Ni, Co and Mn, Ni/Co/Mn, the molar ratio of Li to Me, Li/Me, the precursor species, the molar ratio of NH$_4$X/Me and the type of halogen ions X (X=Cl or F) in the raw material aqueous solution, whether or not ammonia was added to the sodium carbonate aqueous solution, the firing temperature, the ratio of the full width at half maximum (003)/(104), and the crystallite size for the lithium transition metal composite oxide of each of Examples 1 to 6 and Comparative Examples 1 to 17, and the 0.2 C discharge capacity, the 1 C discharge capacity and the discharge capacity retention ratio of the nonaqueous electrolyte secondary battery of each of examples and comparative examples.

TABLE 1

| | Molar ratio Ni/Co/Mn | Molar ratio Li/Me | Precursor species | NH$_4$X added to sulfate solution | X(X=F, Cl) | NH$_4$X/Me | NH$_3$ added to alkali solution | Firing temperature [° C.] |
|---|---|---|---|---|---|---|---|---|
| Example 1 | 5/2/3 | 1.1 | Carbonate | ○ | Cl | 0.0250 | ○ | 850 |
| Example 2 | 5/2/3 | 1.1 | Carbonate | ○ | Cl | 0.0625 | ○ | 850 |
| Example 3 | 5/2/3 | 1.1 | Carbonate | ○ | Cl | 0.1000 | ○ | 850 |
| Example 4 | 5/2/3 | 1.1 | Carbonate | ○ | Cl | 0.2000 | X | 850 |
| Example 5 | 5/2/3 | 1.1 | Carbonate | ○ | F | 0.0250 | ○ | 850 |
| Example 6 | 5/2/3 | 1.1 | Carbonate | ○ | F | 0.0625 | ○ | 850 |
| Comparative Example 1 | 5/2/3 | 1.1 | Carbonate | ○ | Cl | 0.0625 | ○ | 800 |
| Comparative Example 2 | 5/2/3 | 1.1 | Carbonate | ○ | Cl | 0.0625 | ○ | 900 |
| Comparative Example 3 | 5/2/3 | 1.1 | Carbonate | ○ | Cl | 0.0625 | ○ | 950 |
| Comparative Example 4 | 5/2/3 | 1.1 | Carbonate | ○ | Cl | 0.0625 | ○ | 1000 |
| Comparative Example 5 | 5/2/3 | 1.1 | Carbonate | X | — | — | ○ | 800 |
| Comparative Example 6 | 5/2/3 | 1.1 | Carbonate | X | — | — | ○ | 850 |
| Comparative Example 7 | 5/2/3 | 1.1 | Carbonate | X | — | — | ○ | 900 |
| Comparative Example 8 | 5/2/3 | 1.1 | Carbonate | X | — | — | ○ | 950 |
| Comparative Example 9 | 5/2/3 | 1.1 | Carbonate | X | — | — | ○ | 1000 |
| Comparative Example 10 | 5/2/3 | 1.1 | Carbonate | ○ | F | 0.1000 | ○ | 850 |
| Comparative Example 11 | 5/2/3 | 1.1 | Carbonate | ○ | F | 0.2000 | X | 850 |
| Comparative Example 12 | 5/2/3 | 1.1 | Carbonate | ○ | F | 0.0625 | ○ | 800 |
| Comparative Example 13 | 5/2/3 | 1.1 | Carbonate | ○ | F | 0.0625 | ○ | 900 |
| Comparative Example 14 | 5/2/3 | 1.1 | Carbonate | ○ | F | 0.0625 | ○ | 950 |
| Comparative Example 15 | 5/2/3 | 1.1 | Carbonate | ○ | F | 0.0625 | ○ | 1000 |
| Comparative Example 16 | 5/2/3 | 1.1 | Hydroxide | ○ | F | 0.0625 | ○ | 850 |
| Comparative Example 17 | 5/2/3 | 1.1 | Hydroxide | X | — | — | ○ | 850 |
| Comparative Example 18 | 5/2/3 | 1.05 | Hydroxide | X | — | — | ○ | 900 |
| Comparative Example 19 | 5/2/3 | 1.05 | Hydroxide | X | — | 0.0625 | ○ | 900 |

| | FWHM ratio (003)/(104) | Crystallite size [Å] | 0.2 C discharge capacity [mAhg$^{-1}$] | 1 C discharge capacity [mAhg$^{-1}$] | Discharge capacity retention ratio [%] |
|---|---|---|---|---|---|
| Example 1 | 0.854 | 436 | 162.1 | 149.5 | 91.4 |
| Example 2 | 0.850 | 414 | 160.7 | 148.7 | 94.9 |
| Example 3 | 0.814 | 120 | 156.8 | 145.4 | 89.4 |
| Example 4 | 0.836 | 427 | 160.9 | 148.8 | 89.7 |
| Example 5 | 0.861 | 428 | 154.7 | 144.5 | 93.0 |
| Example 6 | 0.853 | 458 | 159.4 | 147.3 | 91.3 |
| Comparative Example 1 | 0.789 | 300 | 158.0 | 140.0 | 77.1 |
| Comparative Example 2 | 0.930 | 432 | 147.0 | 136.0 | 82.8 |
| Comparative Example 3 | 0.953 | 466 | 140.7 | 121.4 | 92.5 |
| Comparative Example 4 | 0.956 | 488 | 132.0 | 105.4 | 97.8 |
| Comparative Example 5 | 0.781 | 341 | 155.3 | 140.2 | 75.6 |

TABLE 1-continued

| | | | | | |
|---|---|---|---|---|---|
| Comparative Example 6 | 0.870 | 390 | 156.7 | 142.9 | 85.3 |
| Comparative Example 7 | 0.937 | 427 | 149.7 | 138.6 | 84.3 |
| Comparative Example 8 | 0.955 | 520 | 131.0 | 113.9 | 92.0 |
| Comparative Example 9 | 1.049 | 504 | 131.2 | 105.9 | 93.4 |
| Comparative Example 10 | 0.852 | 397 | 163.4 | 151.8 | 67.6 |
| Comparative Example 11 | 0.867 | 419 | 155.7 | 143.2 | 63.8 |
| Comparative Example 12 | 0.810 | 346 | 147.6 | 129.1 | 86.7 |
| Comparative Example 13 | 1.014 | 458 | 136.5 | 111.1 | 58.9 |
| Comparative Example 14 | 1.149 | 429 | 121.1 | 100.0 | 91.3 |
| Comparative Example 15 | 0.988 | 495 | 114.7 | 86.0 | 94.5 |
| Comparative Example 16 | 1.107 | 485 | 155.5 | 131.5 | 87.5 |
| Comparative Example 17 | 0.971 | 389 | 161.1 | 143.7 | 69.5 |
| Comparative Example 18 | 0.981 | 456 | 176.0 | 163.7 | 63.3 |
| Comparative Example 19 | 0.805 | 565 | 164.8 | 145.5 | 68.7 |

According to Table 1, the lithium transition metal composite oxides of Examples 1 to 6 were prepared by supplying a raw material aqueous solution with ammonium chloride or ammonium fluoride to a reaction tank to prepare a carbonate precursor in a precursor preparation step, and setting a firing temperature to 850° C. in a firing step.

All the lithium transition metal composite oxides satisfied the specific range in the present invention where the ratio of the full width at half maximum (003)/(104) was 0.810 to 0.865 and the crystallite size was 410 Å or more, and batteries having a discharge capacity retention ratio of 89% or more were obtained.

In particular, the batteries using, as a positive active material, the lithium transition metal composite oxides of Examples 1, 2, 4 and 6 in which the ratio of the full width at half maximum (003)/(104) was 0.83 to 0.855 were shown to have a large 1 C discharge capacity.

The lithium transition metal composite oxides of Comparative Examples 1 to 4 were prepared similarly to Example 2 except that the firing temperatures in the firing step were changed to 800° C., 900° C., 950° C. and 1000° C., respectively. The relationship between the firing temperature, and the ratio of the full width at half maximum (003)/(104) and the crystallite size was such that both the values became larger as the temperature increased, and with respect to the specific range in the present invention, the values were excessively small at 800° C. and excessively large at 900° C. It was shown that the batteries of Comparative Examples 1 to 4 had a smaller 1 C discharge capacity as compared to Example 2, and the batteries of Comparative Examples 1 and 2 in which the firing temperature was 900° C. or lower had a lower discharge capacity retention ratio as compared to Example 2.

The lithium transition metal composite oxides of Comparative Examples 5 to 9 were prepared by forming a precursor without addition of ammonium chloride or ammonium fluoride to a raw material aqueous solution, and setting a firing temperature to 800° C., 850° C., 900° C., 950° C. or 1000° C. in a firing step. It was shown that the ratio of the full width at half maximum (003)/(104) and the discharge capacity retention ratio of the battery tended to increase and the 1 C discharge capacity tended to decrease as the sintering temperature increased.

From Comparative Examples 5 and 6, it can be seen that a lithium transition metal composite oxide in which the ratio of the full width at half maximum (003)/(104) is 0.810 to 0.865 may be obtained when the firing temperature is between 800° C. and 850° C., but the crystallite size is not more than 390 Å, and the discharge capacity retention ratio of the battery is expected to be about 80%. On the other hand, in Comparative Examples 7 to 9 where the firing temperature was higher than 850° C., the crystallite size was 410 Å or more, but the 1 C discharge capacity of the battery was low. Therefore, comparison of Examples 1 to 6 with Comparative Examples 5 to 9 showed that by adding ammonium chloride or ammonium fluoride to the raw material aqueous solution, the crystallite size was increased at a lower firing temperature as compared to a case where such a compound was not added, and moderate anisotropy was achieved.

The lithium transition metal composite oxides of Comparative Examples 10 and 11 represent examples in which the amount of ammonium fluoride added to the raw material aqueous solution in the precursor preparation step was increased, respectively, to four times and eight times that in Example 5.

In Comparative Example 10, the crystallite size is not 410 Å or more as specified in the present invention, and in Comparative Example 11, the ratio of the full width at half maximum (003)/(104) is not between 0.810 and 0.865 as specified in the present invention. Since the batteries of Comparative Examples 10 and 11 have a significantly lower discharge capacity retention ratio as compared to Example 5 and Example 6 in which the amount of ammonium fluoride is 2.5 times that in Example 5, it can be seen that addition of an appropriate amount of ammonium fluoride is required for improvement of charge-discharge cycle performance.

The lithium transition metal composite oxides of Comparative Examples 12 to 15 were prepared similarly to Example 6 except that the firing temperatures in the firing step were changed to 800° C., 900° C., 950° C. and 1000° C., respectively.

In Comparative Example 12 (firing temperature: 800° C.), the crystallite size is excessively small, and in Comparative Examples 13 to 15 (firing temperature: 900° C. or higher), the ratio of the full width at half maximum (003)/(104) is excessively large. It can be seen that the batteries of Comparative Examples 12 and 13 have a lower discharge capacity retention ratio as compared to Example 6 (firing temperature: 850° C.), and the batteries of Comparative Examples 12 to 15 all have a small 1 C discharge capacity.

The lithium transition metal composite oxides of Comparative Examples 16 to 19 are prepared using a hydroxide precursor.

Comparative Example 16 is an example in which ammonium fluoride is added to a raw material aqueous solution for preparing a hydroxide precursor, and Comparative Examples 17 and 18 are examples in which ammonium fluoride is not added. In both the comparative examples, the ratio of the full width at half maximum (003)/(104) was above the range specified in the present invention, and only a battery having a small discharge capacity retention ratio was obtained.

Comparative Example 19 is an example in which the Li/Me ratio and the firing temperature were the same as those in Comparative Example 18, and ammonium fluoride was added to ion-exchange water in the reaction tank before dropwise addition of the raw material aqueous solution rather than adding ammonium fluoride to the raw material aqueous solution. In Comparative Example 19, the ratio of the full width at half maximum (003)/(104) was below the range specified in the present invention, and only a battery having a low discharge capacity retention ratio was obtained similarly to Comparative Example 18.

Examination of effects on charge-discharge cycle performance by addition of ammonium fluoride to the raw material aqueous solution and by addition of ammonium fluoride to the ion-exchange water in the reaction tank before dropwise addition of the raw material aqueous solution, on the basis of the results from Comparative Examples 16 to 19, show that in Comparative Example 16 where ammonium fluoride was added to the raw material aqueous solution, the discharge capacity retention ratio increased from 69.5% to 87.5% as compared with Comparative Example 17 where ammonium fluoride was not added, whereas in Comparative Example 19 where ammonium fluoride was added to the ion-exchanged water in the reaction tank before dropwise addition of the raw material aqueous solution, the discharge capacity retention ratio was almost equal to the discharge capacity retention ratio in Comparative Example 18 where ammonium fluoride was not added. Therefore, it can be seen that addition of ammonium fluoride to the raw material aqueous solution is more effective for providing a nonaqueous electrolyte secondary battery having excellent charge-discharge cycle performance.

For the lithium transition metal composite oxides of Examples 2 and 6 and Comparative Examples 6 and 19, the values of the measured total pore volumes are as follows.

| | |
|---|---|
| Example 2 | 6.6 mm$^3$/g |
| Example 6 | 8.3 mm$^3$/g |
| Comparative Example 6 | 8.7 mm$^3$/g |
| Comparative Example 19 | 3.9 mm$^3$/g |

These results show that the total pore volume of the lithium transition metal composite oxide using the carbonate precursor is 5.0 mm$^3$/g or more, and the total pore volume of the lithium transition metal composite oxide using the hydroxide precursor is less than 5.0 mm$^3$/g.

From these results, it can be seen that the total pore volume tends to slightly decrease when halogen ions are added to the raw material aqueous solution. It is assumed that this is because the degree of crystal growth during firing has changed (crystal orientation has changed) by addition of halogen ions, and during its process, the surface area has decreased.

INDUSTRIAL APPLICABILITY

By using the positive active material containing the lithium transition metal composite oxide according to the present invention, a nonaqueous electrolyte secondary battery excellent in charge-discharge cycle performance can be provided, and the nonaqueous electrolyte secondary battery is useful as a nonaqueous electrolyte secondary battery for hybrid vehicles, plug-in hybrid vehicles and electric vehicles.

DESCRIPTION OF REFERENCE SIGNS

1: Nonaqueous electrolyte secondary battery
2: Electrode group
3: Battery case
4: Positive electrode terminal
4': Positive electrode lead
5: Negative electrode terminal
5': Negative electrode lead
20: Energy storage unit
30: Energy storage apparatus

The invention claimed is:

1. A positive active material for a nonaqueous electrolyte secondary battery, comprising a lithium transition metal composite oxide, the lithium transition metal composite oxide having an α-NaFeO$_2$ structure, containing Ni, Co and Mn as a transition metal (Me), and having an X-ray diffraction pattern attributable to a space group R3-m, wherein a ratio of the full width at half maximum of a diffraction peak of the (003) plane to the full width at half maximum of a diffraction peak of the (104) plane, (003)/(104) at a Miller index hkl in X-ray diffraction measurement using a CuKα ray is 0.810 to 0.865, and a crystallite size is 410 Å or more.

2. The positive active material for a nonaqueous electrolyte secondary battery according to claim 1, wherein a molar ratio Ni/Me of Ni to the Me is 0.35 to 0.6.

3. The positive active material for a nonaqueous electrolyte secondary battery according to claim 1, wherein the lithium transition metal composite oxide has a total pore volume of 5.0 mm$^3$/g or more.

4. A method for producing the positive active material for a nonaqueous electrolyte secondary battery according to claim 1, the method comprising: supplying an aqueous solution containing halogen ions, ammonium ions, and Ni, Co and Mn as transition metals (Me) to a reaction tank; preparing a carbonate precursor containing Ni, Co and Mn; and firing a mixture of the carbonate precursor with a lithium compound to obtain a lithium transition metal composite oxide.

5. A positive electrode for a nonaqueous electrolyte secondary battery, comprising the positive active material according to claim 1.

6. A nonaqueous electrolyte secondary battery comprising the positive electrode according to claim 5, a negative electrode, and a nonaqueous electrolyte.

7. An energy storage apparatus comprising a plurality of the nonaqueous electrolyte secondary batteries according to claim 6.

* * * * *